(12) United States Patent
Yuyama et al.

(10) Patent No.: US 10,373,311 B2
(45) Date of Patent: Aug. 6, 2019

(54) MEDICINE INSPECTION ASSISTANCE DEVICE

(71) Applicant: YUYAMA MFG. CO., LTD., Osaka (JP)

(72) Inventors: Shoji Yuyama, Osaka (JP); Naoki Koike, Osaka (JP); Masao Fukada, Osaka (JP); Akira Maeda, Osaka (JP)

(73) Assignee: YUYAMA MFG. CO., LTD., Osaka (JP)

( * ) Notice: Subject to any disclaimer, the term of this patent is extended or adjusted under 35 U.S.C. 154(b) by 43 days.

(21) Appl. No.: 15/514,190

(22) PCT Filed: Aug. 10, 2015

(86) PCT No.: PCT/JP2015/072592
§ 371 (c)(1),
(2) Date: Mar. 24, 2017

(87) PCT Pub. No.: WO2016/047295
PCT Pub. Date: Mar. 31, 2016

(65) Prior Publication Data
US 2017/0301087 A1  Oct. 19, 2017

(30) Foreign Application Priority Data
Sep. 25, 2014 (JP) .................... 2014-195844

(51) Int. Cl.
*G06K 9/00* (2006.01)
*G06T 7/00* (2017.01)
(Continued)

(52) U.S. Cl.
CPC ............... *G06T 7/0012* (2013.01); *A61J 1/03* (2013.01); *A61J 3/00* (2013.01)

(58) Field of Classification Search
CPC .............. A61J 1/03; A61J 3/00; G06T 7/0012
See application file for complete search history.

(56) References Cited

U.S. PATENT DOCUMENTS 7,080,755 B2 * 7/2006 Handfield ............. A61J 7/0084
                                                      221/13
8,340,392 B2 * 12/2012 Kim ...................... G01B 11/24
                                                      348/125

(Continued)

FOREIGN PATENT DOCUMENTS

JP   2006-513953 A   4/2006
JP      4034404 B2   1/2008
(Continued)

OTHER PUBLICATIONS

International Search Report in PCT/JP2015/072592, dated Oct. 27, 2015.

*Primary Examiner* — Bhavesh M Mehta
*Assistant Examiner* — Ian L Lemieux
(74) *Attorney, Agent, or Firm* — Hauptman Ham, LLP

(57) ABSTRACT

Inspection of a shape-fixed medicine is performed before packing. A medicine inspection assistance device includes: a medicine support part for rotatably supporting a shape-fixed medicine by a first rotating roller and a second rotating roller, and a medicine imaging part having an imaging means for imaging the shape-fixed medicine supported by the medicine support part from above. The medicine support part is configured such that a contact position between the first rotating roller and the shape-fixed medicine is located above the second rotating roller and the contact position is closer to an axis of the first rotating roller than a gravity center position of the shape-fixed medicine.

8 Claims, 27 Drawing Sheets

(51) Int. Cl.
*A61J 3/00* (2006.01)
*A61J 1/03* (2006.01)

(56) References Cited

U.S. PATENT DOCUMENTS

| | | |
|---|---|---|
| 2006/0213816 A1 | 9/2006 | Jorritsma |
| 2009/0161941 A1 | 6/2009 | Nakanishi et al. |
| 2011/0285841 A1 | 11/2011 | Matsuda et al. |
| 2012/0096807 A1* | 4/2012 | Okuma ............... B65B 9/08 53/111 R |
| 2013/0058550 A1* | 3/2013 | Tanimoto ........... G01N 21/9508 382/128 |
| 2014/0033644 A1* | 2/2014 | Amano ................ H04N 7/18 53/52 |
| 2016/0104277 A1* | 4/2016 | Takamori ............ G01J 3/46 382/128 |

FOREIGN PATENT DOCUMENTS

| | | |
|---|---|---|
| JP | 4439433 B2 | 3/2010 |
| JP | 2011-242319 A | 12/2011 |
| WO | 2004/112685 A1 | 12/2004 |

\* cited by examiner

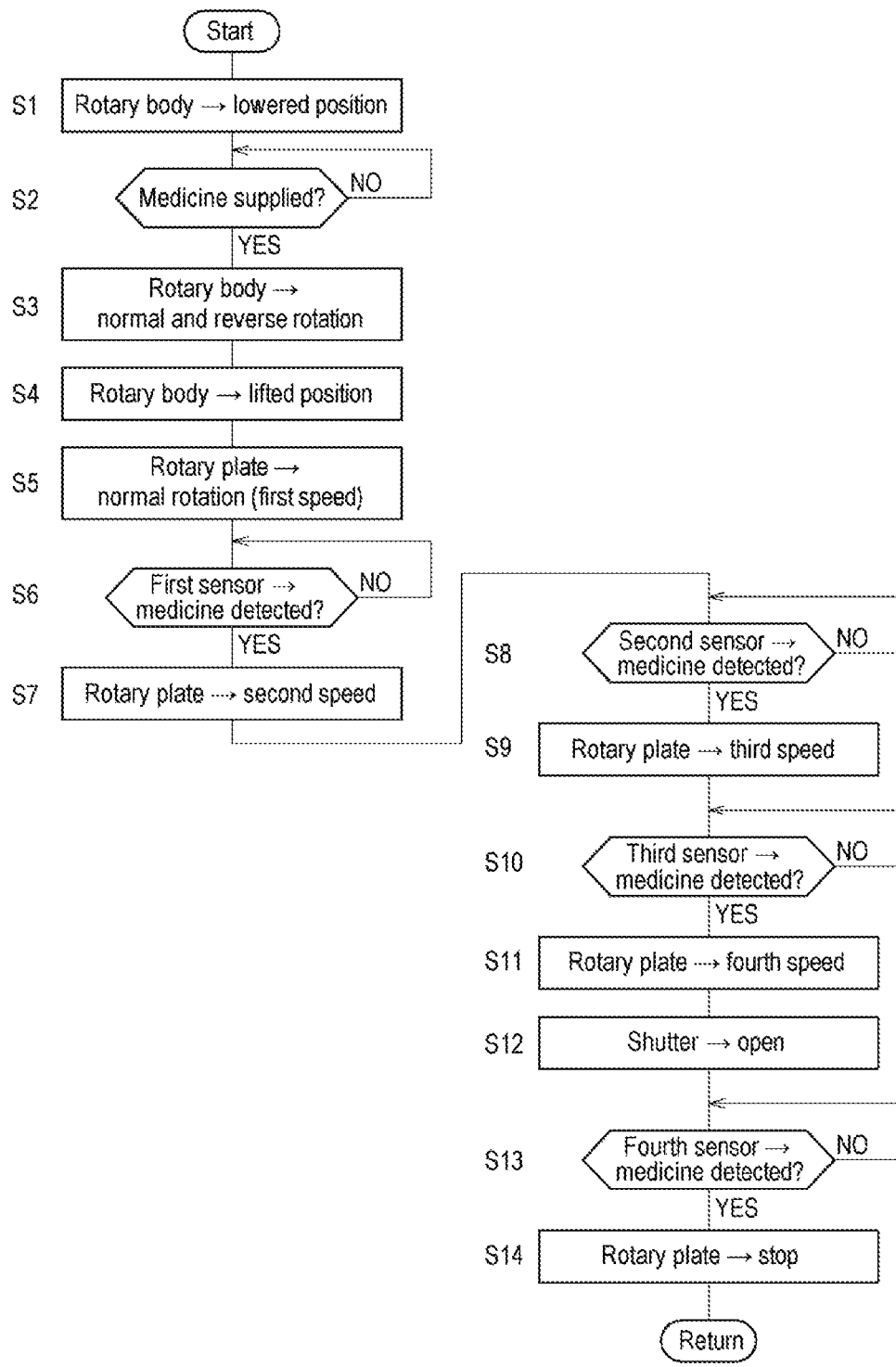

FIG. 19A

| Medicine | Master image | Morning | | | | | | | | Daytime | | | |
| --- | --- | --- | --- | --- | --- | --- | --- | --- | --- | --- | --- | --- | --- |
| | | 1st day | 2nd day | 3rd day | 4th day | 5th day | 6th day | 7th day | ... | 1st day | 2nd day | 3rd day | ... |
| Medicine A | aaa Front / aaa Back | aaa | | ... | ... | ... | ... | ... | | | | | |
| Medicine B | bbb Front / bbb Back | bbb | ccc | ... | | | | ... | | bbb | bbb aaa | | |
| Medicine C | ccc Front / ccc Back | ccc | | ... | | | | ... | | ccc | | | |
| Medicine C | ccc Front / ccc Back | ccc | | ... | | | | ... | | ccc | | | |

FIG. 19B

| | Master image | Imaged image | Inspection result |
|---|---|---|---|
| Medicine B | bbb ◯<br>Front  Back | bbb | OK |
| Medicine C | ccc ◯<br>Front  Back | ccc | OK |
| Medicine C | ccc ◯<br>Front  Back | ccc | OK |

FIG. 20

| | Master image | Morning 1st day | 2nd day | 3rd day | 4th day | 5th day | 6th day | 7th day | Daytime 1st day | 2nd day | 3rd day | ... |
|---|---|---|---|---|---|---|---|---|---|---|---|---|
| Medicine A | ◯ aaa Front  ◯ Back | 4 tablets OK  aaa | ... | ... | ... | ... | ... | ... | 3 tablets OK | ... | ... | |
| Medicine B | bbb Front  Back | bbb | | | | | | | bbb | | | |
| Medicine C | ccc Front  Back | ccc | | | | | | | ccc | | | |
| Medicine C | ccc Front  Back | ccc | | | | | | | ccc | | | |

FIG. 22A

| Prescription ID XXXXXXX | 1 dose when getting up |
| Patient name ○○ ○○ | for 9 days |

Total number of packs: 9 packs

| No | Medicine name | Result | Correct image | 1st pack | 2nd pack | 3rd pack | 4th pack | 5th pack | 6th pack | 7th pack | 8th pack | 9th pack |
|---|---|---|---|---|---|---|---|---|---|---|---|---|
| 1 | Tablet A 100mg | NG | ◉ | ○ | ◉ | ◉ | ◉ | ◉ | ◉ | ◉ | ◉ | ◉ |

Inspection result: NG

Inspection NG: displayed by ■
Packing OK: displayed by □
Packing NG: displayed by □

[Clear]  [Set]  [End]

| 3 doses for 7 days | Morning | Daytime | Evening |
|---|---|---|---|
| Medicine A (○) | 1 | 2 | 1 |
| Medicine B (△) | 1 | 1 | 1 |
| Medicine C (□) | 2 | 1 | 1 |
| Sum | 4 | 4 | 3 |

FIG. 23B

|  | 1st day | 2nd day | 3rd day | 4th day | 5th day | 6th day | 7th day |
|---|---|---|---|---|---|---|---|
| Morning (4) | ○ | ○ | ○ | ○ | ○ | ○ | ○ |
|  | △ | △ | △ | △ | △ | △ | △ |
|  | □ | □ | □ | □ | □ | □ | □ |
|  | □ | □ | □ | □ | □ | □ | □ |
| Daytime (4) | ○ | ○ | ○ | ○ | ○ | ○ | ○ |
|  | ○ | ○ | ○ | ○ | ○ | //-// | ○ |
|  | △ | △ | △ | △ | △ | △ | △ |
|  | □ | □ | □ | □ | □ | □ | □ |
|  |  |  |  |  |  |  | //○// |
| Evening (3) | ○ | //-// | ○ | ○ | ○ | ○ | ○ |
|  | △ | △ | △ | △ | △ | △ | △ |
|  | □ | □ | □ | □ | □ | □ | □ |
|  |  |  | //○// |  |  |  |  |

FIG. 24A
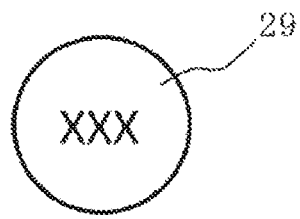
FIG. 24B
FIG. 24C
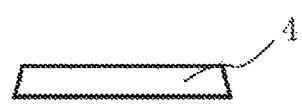
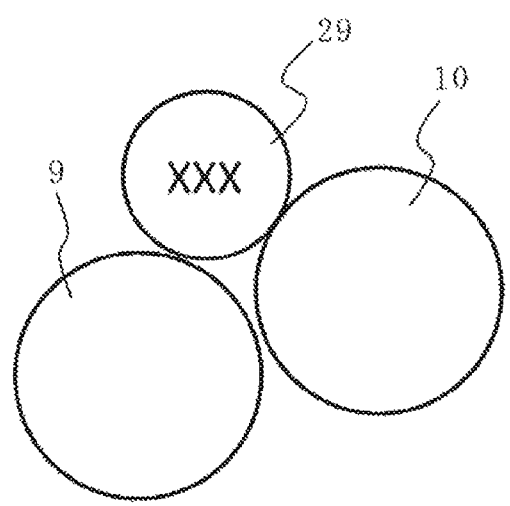

MEDICINE INSPECTION ASSISTANCE DEVICE

CROSS-REFERENCE TO RELATED APPLICATIONS

This application is a 35 U.S.C § 371 national stage filing of International Application No. PCT/JP2015/072592, filed on Aug. 10, 2015, which claims the benefit of Japanese Patent Application No. 2014-195844, filed on Sep. 25, 2014.

TECHNICAL FIELD

The present invention relates to a medicine inspection assistance device for inspecting a shape-fixed medicine such as a tablet, a capsule medicine, a suppository or the like before packing the same.

BACKGROUND

There exists in the art a medicine inspection assistance device which images a medicine before packing the medicine into a packing paper and then inspects the medicine, and a medicine inspection assistance device which images the medicine after packing the medicine and then inspects the medicine.

In the former, for example, as disclosed in Patent Document 1, only tablets needed to be inspected are supplied to a turntable, and are imaged by a camera, and are then transferred from a discharge hopper through a transfer conveyor, and thereafter are packed one pack at a time by a packing device.

In the latter, for example, as disclosed in Patent Document 2, packed tablets are imaged by an imaging device while being illuminated by an illumination device, and the number of the tablets is counted from a negative image.

However, in the configuration disclosed in Patent Document 1, there is no disclosure as to a structure for overturning the tablet. Thus, when an engraving information is not formed in a front surface of the transferred medicine, but in a back surface of the medicine, the engraving information cannot be read.

Further, in the configuration disclosed in Patent Document 2, tablets are imaged under a state where a packing paper is interposed between the tablets and the imaging device. Thus, it is impossible to read an engraving or the like formed in a surface of the tablet. Further, there is a concern in that imaging cannot be performed properly due to overlapping tablets.

Patent Document 1: Japanese Patent No. 4034404
Patent Document 2: Japanese Patent No. 4439433

SUMMARY

It is an object of the present invention to perform inspection of a shape-fixed medicine before packing the shape-fixed medicine.

As a means for achieving the aforementioned object, the present invention provides a medicine inspection assistance device which includes: a medicine support part configured to rotatably support a shape-fixed medicine by a first rotating roller and a second rotating roller; and an imaging means configured to image the shape-fixed medicine supported on the medicine support part from above.

According to this configuration, it is possible to reliably image an identifier formed in one of the front and back surfaces of the shape-fixed medicine.

Preferably, above at least one of the first rotating roller and the second rotating roller, a guide wall is disposed at one of the guide areas which face from a vertical plane passing through at least a rotation center toward the other of the first rotating roller and the second rotating roller. Preferably, both the first rotating roller and the second rotating roller are rotated in the same direction, and a rotation direction of one of the first rotating roller and the second rotating roller is a direction which faces from the other of the first rotating roller and the second rotating roller toward the vertical plane at a location where the shape-fixed medicine is supported.

According to this configuration, even when the shape-fixed medicine is rotated, a movement range of the shape-fixed medicine can be restricted by the guide wall. Thus, it is possible to reduce a diameter dimension of the first rotating roller and the second rotating roller.

Preferably, the medicine support part is configured such that, with respect to a first contact position between the first rotating roller and the shape-fixed medicine, a second contact position between the second rotating roller and the shape-fixed medicine is located above the first contact position and that the second contact position is located closer to an axis of the first rotating roller than a gravity center position of the shape-fixed medicine.

According to this configuration, the shape-fixed medicine supported on the medicine support part by the first rotating roller and the second rotating roller can be reliably rotated in place.

An axis of the second rotating roller is located above an axis of the first rotating roller, and the second rotating roller may be rotated in the same direction as a rotation direction of the first rotating roller which faces toward the second rotating roller at an area in which the shape-fixed medicine is placed.

Preferably, the first rotating roller has an outer peripheral surface whose diameter dimension gradually increases toward an axial-directional central portion. Preferably, the second rotating roller has an outer peripheral surface whose diameter dimension gradually decreases toward an axial-directional central portion, and the second rotating roller is disposed along the outer peripheral surface of the first rotating roller.

According to this configuration, it is possible to apply a force to the shape-fixed medicine rotated by the first rotating roller and the second rotating roller such that the shape-fixed medicine is moved toward the axial-directional central portion. Accordingly, the shape-fixed medicine supported by the medicine support part can always be maintained in the position suitable for the imaging performed by the imaging means.

Preferably, the first rotating roller and the second rotating roller are disposed so as to be relatively moved toward or away from each other, and the medicine inspection assistance device includes a guide member configured to guide a lateral side of a gap formed between the first rotating roller and the second rotating roller when the first rotating roller and the second rotating roller are moved away from each other.

According to this configuration, even when the shape-fixed medicine supported on the medicine support part is dropped by moving the first rotating roller and the second rotating roller away from each other, a movement of the shape-fixed medicine toward the lateral side can be prevented by the guide member.

Preferably, a rotation direction of the first rotating roller is reversed when the first rotating roller and the second rotating roller are relatively moved away from each other.

According to this configuration, it is possible to reliably prevent the shape-fixed medicine from staying on the first rotating roller.

Preferably, the medicine inspection assistance device comprises a plurality of the medicine support parts. The plurality of the medicine support parts are disposed annularly and are synchronously rotated by a predetermined pitch in a circumferential direction.

According to this configuration, the supply of the shape-fixed medicine to the medicine support part, the imaging by the imaging means, the discharge from the medicine support part, and the like can be performed in different positions, respectively. Thus, it is possible to efficiently execute the respective processes.

Preferably, the shape-fixed medicine is specified based on an appearance information of the shape-fixed medicine imaged by the imaging means.

According to this configuration, even when an identifier such as an engraving, a print or the like formed in the shape-fixed medicine cannot be read by the imaging means or even when an identifier is not formed in the shape-fixed medicine, it is possible to specify the type of the shape-fixed medicine based on the appearance information such as a shape, a color or the like, and to inspect the shape-fixed medicine.

Preferably, the medicine inspection assistance device includes a device body to which the medicine support part is attached. Preferably, the device body has an illumination means configured to illuminate the shape-fixed medicine supported on the medicine support part from above. Preferably, the medicine support part has a reflection means configured to reflect light emitted from the illumination means and configured to irradiate the light from a lateral side of the shape-fixed medicine supported on the medicine support part.

According to this configuration, the shape-fixed medicine can be irradiated by a single illumination means from the upper side and the lateral side. The shape-fixed medicine can be illuminated in a state suitable for the imaging performed by the imaging means.

As a means for achieving the aforementioned object, the present invention provides a medicine inspection assistance device which includes: a medicine imaging part disposed inside a medicine packing device which is configured to pack a shape-fixed medicine dispensed from a medicine cassette or a manual distribution medicine supply part; and a specification means configured to specify a shape-fixed medicine identifier formed in the shape-fixed medicine, wherein the medicine imaging part includes: a medicine support part having a first rotating roller and a second rotating roller and configured to rotatably support the shape-fixed medicine dispensed from the medicine cassette or the manual distribution medicine supply part by the first rotating roller and the second rotating roller; an imaging means configured to image the shape-fixed medicine supported by the medicine support part at multiple times while rotating the shape-fixed medicine or before and after rotating the shape-fixed medicine; and a supply means configured to supply the shape-fixed medicine imaged by the imaging means to a packing unit of the medicine packing device, and wherein the specification means is configured to specify the shape-fixed medicine identifier formed in the shape-fixed medicine from an imaged image of the shape-fixed medicine imaged by the imaging means.

As a means for achieving the aforementioned object, the present invention provides a medicine inspection assistance method which is performed before a shape-fixed medicine is packed after the shape-fixed medicine is dispensed from a medicine cassette or a manual distribution medicine supply part. The method includes: dispensing the shape-fixed medicine from the medicine cassette or the manual distribution medicine supply part to a medicine support part having a first rotating roller and a second rotating roller; imaging the shape-fixed medicine supported by the medicine support part at multiple times while rotating the shape-fixed medicine or before and after rotating the shape-fixed medicine; specifying a shape-fixed medicine identifier formed in the shape-fixed medicine from an imaged image of the imaged shape-fixed medicine; and supplying the imaged shape-fixed medicine from the medicine support part to a packing unit of a medicine packing device.

According to the present invention, it is possible to reliably rotate the shape-fixed medicine supported by the first rotating roller and the second rotating roller. Therefore, it is possible for the imaging means to reliably image an identifier such as an engraving or the like formed in the shape-fixed medicine. Further, it is possible to properly perform inspection of the shape-fixed medicine.

BRIEF DESCRIPTION OF THE DRAWINGS

FIG. 14 is viewed from a lower side.

FIG. 18 is a flowchart showing an operation of the medicine separation part shown in FIG. 17.

FIG. 19A shows the result of count inspection performed by the control unit shown in FIG. 11.

FIG. 19B shows a check screen displayed by clicking on a dosing date shown in FIG. 19A.

FIG. 20 shows another example of the result of the count inspection performed by the control unit shown in FIG. 11.

FIG. 22A shows an example of an output image displayed in a touch panel shown in FIG. 9.

FIG. 22B shows a state where an enlarged view of an image of a shape-fixed medicine is displayed in a popup manner by touching a screen shown in FIG. 22A.

FIG. 23A is a table showing one example of prescription data according to the present embodiment.

FIG. 23B shows an example of an inspection assistance result screen which is displayed after performing the medicine inspection assistance process based on the prescription data shown in FIG. 23A.

FIG. 24A is a top view of a shape-fixed medicine.

FIG. 24B is a side view of the shape-fixed medicine.

FIG. 24C shows a state where the shape-fixed medicine is rotated by rollers.

DETAILED DESCRIPTION

Figure 1:
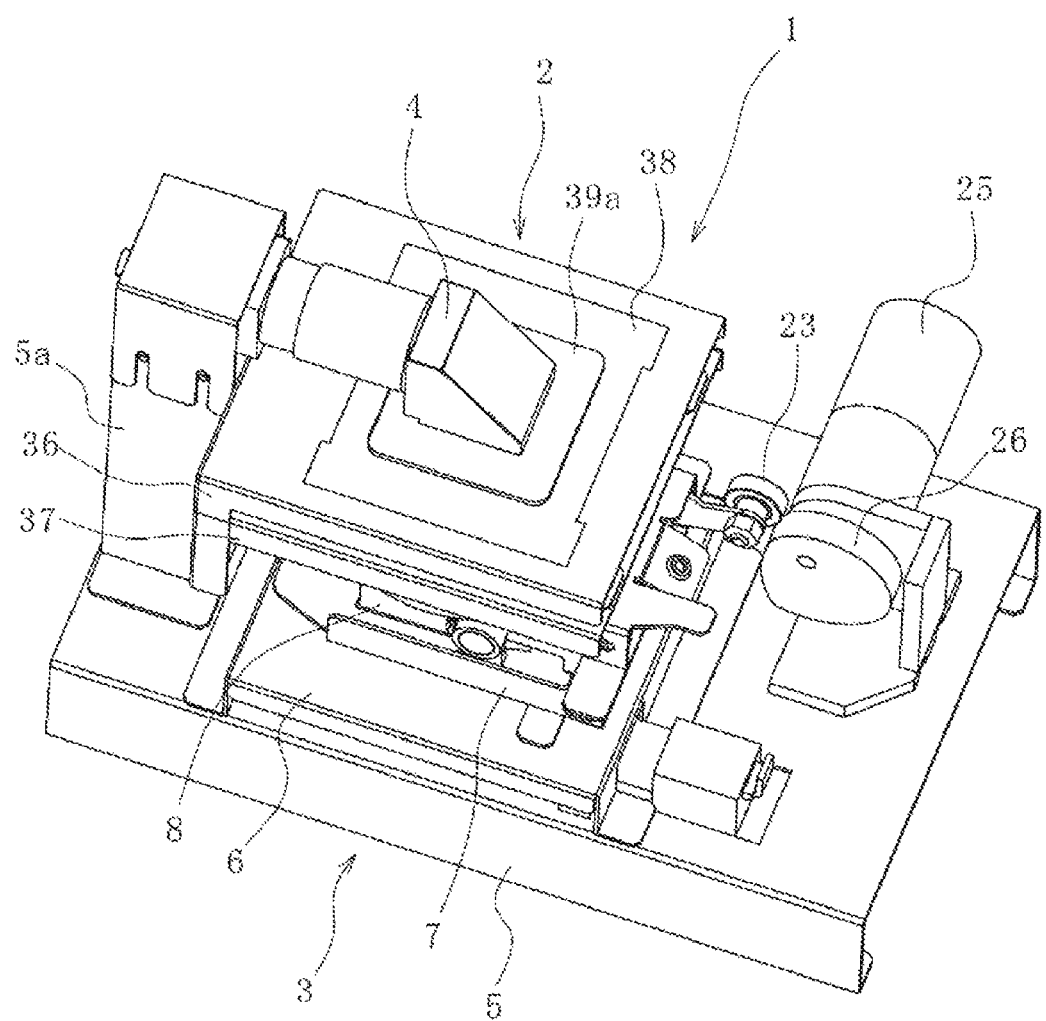
FIG. 1 is a perspective view of a medicine inspection assistance device according to the present embodiment.

Hereinafter, descriptions are made with reference to the accompanying drawings as to embodiments of the present invention. The terms indicating specific directions or positions (e.g., the terms including "upper", "lower", "side", "end") are used in the descriptions made below, when necessary. Those terms are used for easy understanding of the invention referring to the drawings. The technical scope of the present invention is not limited by the meaning of those terms. Further, the descriptions made below are only illustrative, and are not intended to limit the present invention, applications thereof or use thereof.

1. Overall Configuration

FIG. 1 shows a medicine inspection assistance device 1 according to the present embodiment. The medicine inspection assistance device 1 includes a medicine imaging part 2. The medicine imaging part 2 includes a medicine support part 3 and a camera 4 which is an imaging means.

(1-1. Medicine Support Part 3)

Figure 3:
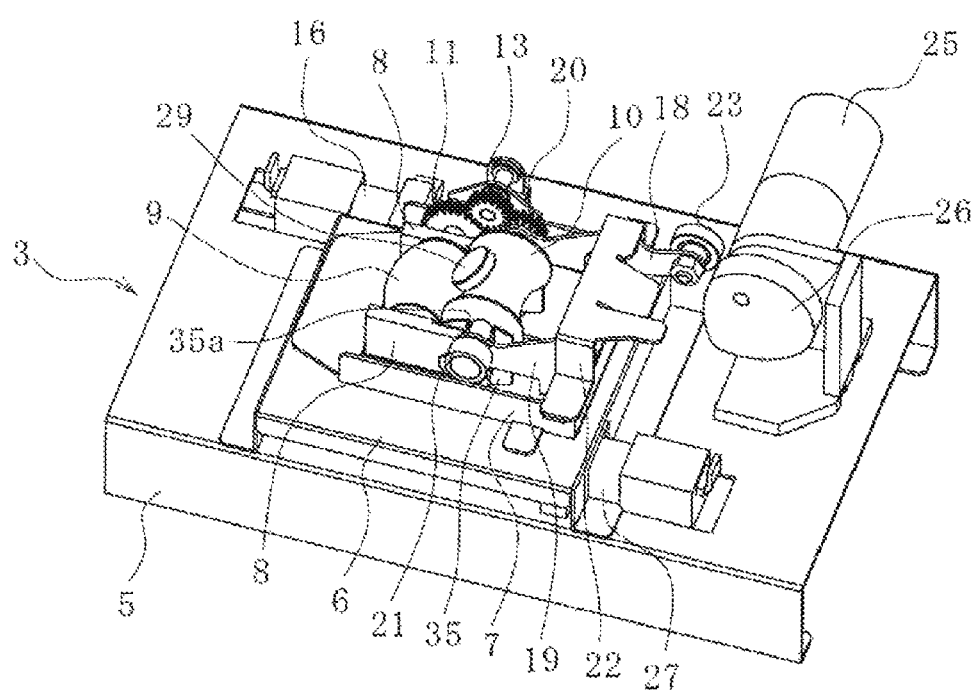
FIG. 3 is a perspective view showing a state where a light guide member and a reflection member are removed from FIG. 2.

In the medicine support part 3, a first assistance plate 6 is mounted on a base plate 5. An opening portion is formed in an upper surface of the first assistance plate 6. A second assistance plate 7 is mounted on the upper surface of the first assistance plate 6 so as to surround the opening portion. As shown in FIG. 3, a first rotating roller 9 and a second rotating roller 10 are rotatably supported by support plates 8 which are respectively attached to inner surfaces of both sidewalls of the second assistance plate 7.

The first rotating roller 9 is formed by integrating a rubber-made roller portion around a rotating shaft. The first rotating roller 9 has an outer circumferential surface which has an arc-shaped cross section and gradually swells radially outward from both ends toward a central portion along a axial direction. The rotating shaft of the first rotating roller 9 passes through one of the support plates 8. A driven gear 11 is integrated with a distal end portion of the rotating shaft of the first rotating roller 9.

Figure 4:
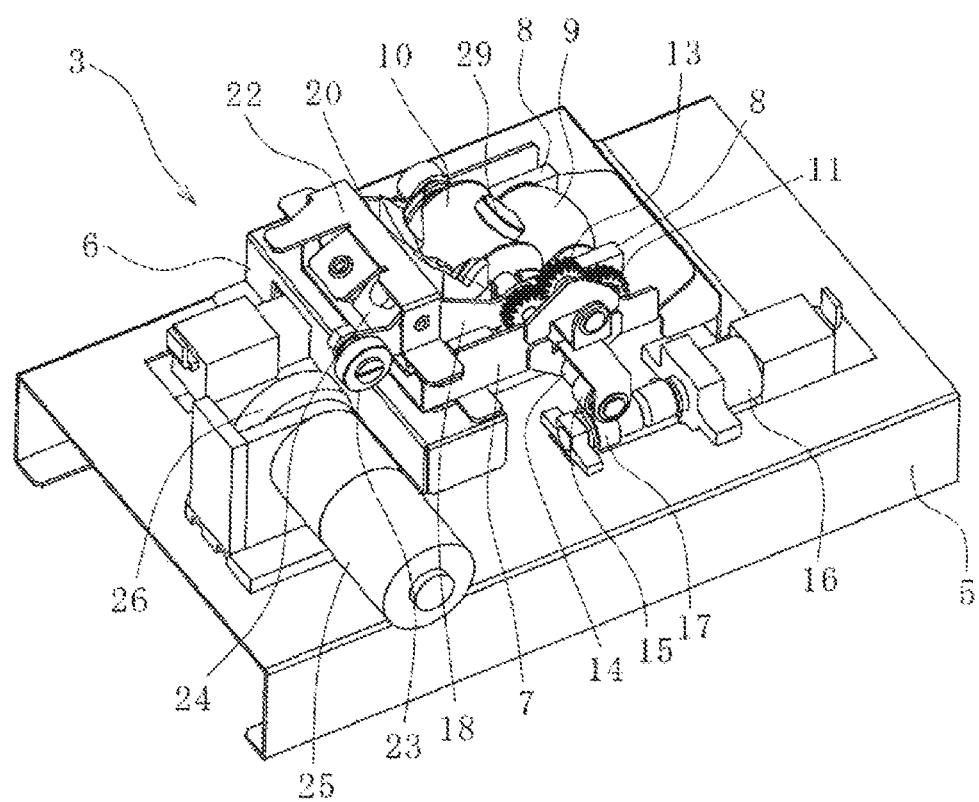
FIG. 4 is a perspective view showing a state where the device of FIG. 3 is viewed from another direction.
Figure 5:
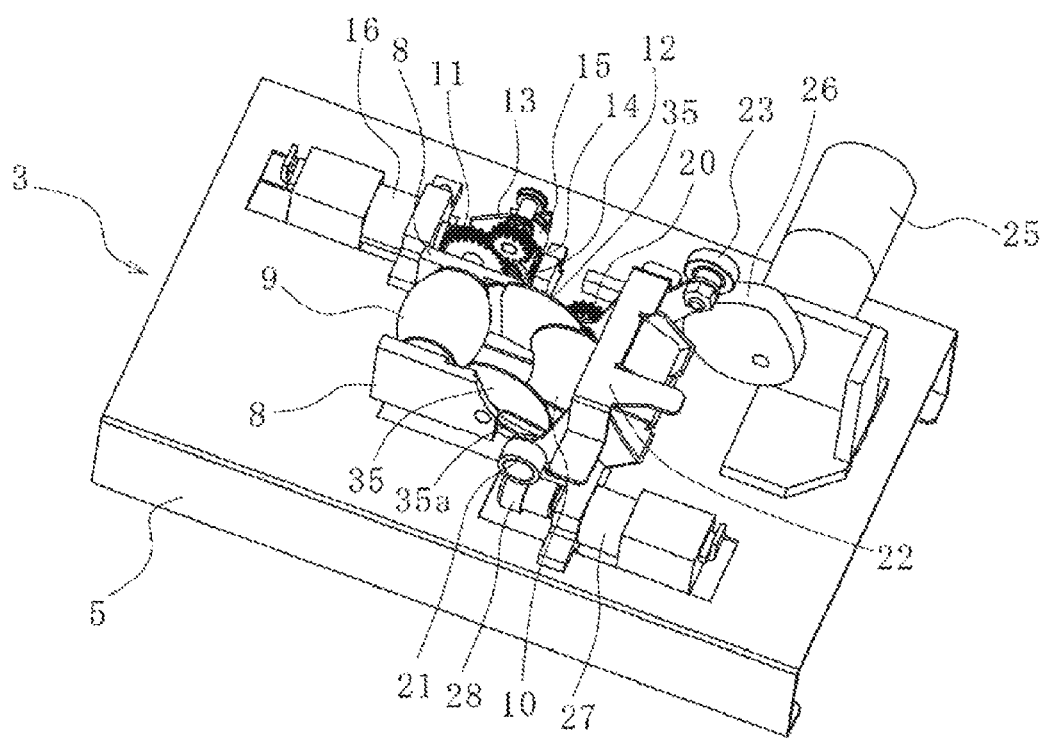
FIG. 5 is a perspective view showing a state where a second rotating roller is pivoted from a closest approaching position shown in FIG. 3 to an open position.

A driving gear 12 and an intermediate gear 13 mesh with the driven gear 11. As shown in FIG. 5, the driving gear 12 is fixed to one end portion of a drive shaft 14. As shown in FIG. 4, the drive shaft 14 is rotatably supported by one of the sidewalls of the second assistance plate 7. A driven magnet 15 is fixed to the opposite end portion of the drive shaft 14. The driven magnet 15 has a cylindrical shape. Magnetic poles of an outer circumferential surface of the driven magnet 15 are alternately different in a circumferential direction. The driven magnet is magnetized such that each pole face is inclined by 45° with respect to the axial direction of the drive shaft 14.

A driving magnet 17 fixed to a rotating shaft of a first motor 16 is disposed to face the driven magnet 15. A rotation center of the driven magnet 15 and a rotation center of the driving magnet 17 are orthogonal to each other. Similar to the driven magnet 15, the driving magnet 17 has a cylindrical shape. Magnetic poles of an outer circumferential surface of the driving magnet 17 are alternately different in a circumferential direction. However, the driving magnet 17 is magnetized such that each pole face is inclined at −45° (opposite to the driven magnet 15) with respect to the axial direction of the drive shaft 14. Thus, if the driving magnet 17 is rotated, then the pole faces of a portion, which is located opposite the driven magnet 15 in the outer circumferential surface of the driving magnet 17, is sequentially changed to have different polarities. Therefore, the driven magnet 15 does not make contact with the driving magnet 17 and is rotated while forming magnetic coupling in which corresponding pole faces of reverse polarity are positioned. As the driven magnet 15 and the driving magnet 17, for example, Magtran (registered trademark: manufactured by FEC Corporation) or the like can be used.

Similar to the first rotating roller 9, the second rotating roller 10 is formed by integrating a rubber-made roller portion around a rotating shaft. As shown in FIG. 3, both end portions of a rotating shaft of the second rotating roller 10 are rotatably supported by a first pivoting arm 18 and a second pivoting arm 19, respectively. The second rotating roller 10 has an outer circumferential surface which has an arc-shaped cross section and is gradually recessed radially inward from both ends toward a central portion along an axial direction, and which is formed so as to conform to the outer circumferential surface of the first rotating roller 9. One end portion of the rotating shaft of the second rotating roller 10 passes through the first pivoting arm 18. A driven gear 20 is fixed to a distal end portion of the rotating shaft of the second rotating roller. Since the driven gear 11 of the first rotating roller 9 is rotated by the driving gear 12, the second rotating roller 10 is rotated in the same direction as the first rotating roller 9 through the intermediate gear 13 and the driven gear 20. Further, the opposite end portion of the rotating shaft of the second rotating roller 10 passes through the second pivoting arm 19, and is integrated with a driven magnet 21 at a distal end portion thereof.

As shown in FIG. 4, the first pivoting arm 18 is supported by one side surface of a third assistance plate 22, which is fixed to the second assistance plate 7 so as to extend over the second assistance plate 7, such that the first pivoting arm 18 can pivot about a support shaft. One end portion of the first pivoting arm 18 is rotatably connected to the rotating shaft of the second rotating roller 10. A rolling roller 23 is rotatably attached to the opposite end portion of the first pivoting arm 18.

As shown in FIG. 3, the second pivoting arm 19 is supported by the opposite side surface of the third assistance plate 22 so as to be pivotable about a pivot shaft. A connection portion 24 (see FIG. 4), which extends perpendicularly from an intermediate portion of the second pivoting arm, is formed in the second pivoting arm 19. The connection portion 24 is connected to the first pivoting arm 18. Thus, the first pivoting arm 18 and the second pivoting arm 19 are integrally rotatable. A spring (not shown) is disposed between the connection portion 24 and the intermediate portion of the second assistance plate 7. Thus, the first pivoting arm 18 and the second pivoting arm 19 are biased such that the second rotating roller 10 is positioned in a closest approaching position where the second rotating roller 10 is closest to the first rotating roller 9 (see FIG. 7 wherein a gap of 0.5 mm is formed).

An outer circumferential surface of an eccentric cam 26, which is integrated with the rotation shaft of a second motor 25, can make contact with the outer circumferential surface of the rolling roller 23. If the second motor 25 is driven, then the eccentric cam 26 is rotated to displace a slide contact position between an outer circumferential surface of the eccentric cam 26 and the rolling roller 23. Thus, the second rotating roller 10 is moved against a biasing force of the spring (not shown) to an open position where the second rotating roller 10 is moved away from the first rotating roller 9.

As shown in FIG. 5, in the state where the second rotating roller 10 is moved to the open position, the driven magnet 21 integrated with the rotating shaft of the second rotating roller 10 is located opposite a driving magnet 28 integrated with a rotating shaft of a third motor 27. The magnetized states of the driven magnet 21 and the driving magnet 28 are the same as those of the first rotating roller.

Figure 7:
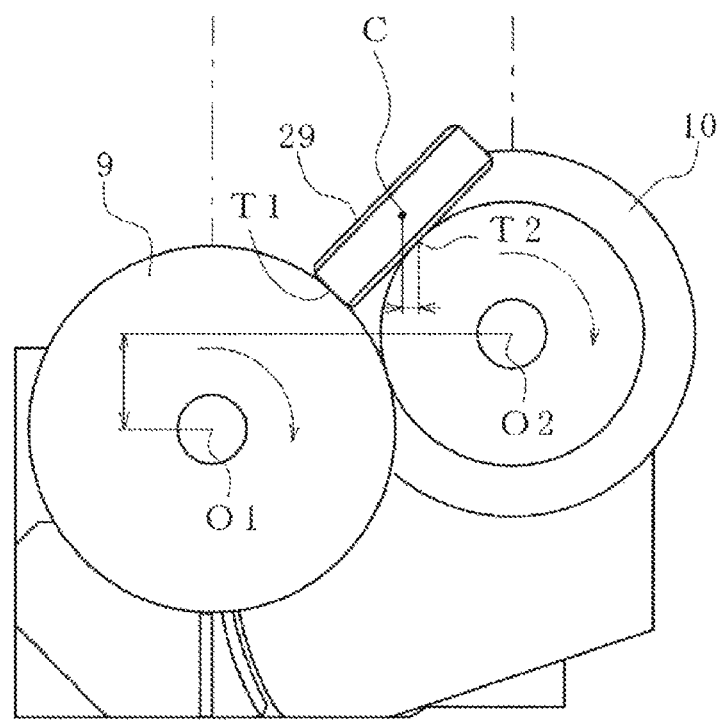
FIG. 7 is a sectional view of a first rotating roller, a second rotating roller and members in the vicinity thereof.

As shown in FIG. 7, when the second rotating roller 10 is positioned in the closest approaching position closest to the first rotating roller 9, the rotation center of the second rotating roller 10 is positioned above the rotation center of the first rotating roller 9. Further, the first rotating roller 9 and the second rotating roller 10 are rotated in the same direction. That is to say, as indicated by arrows in FIG. 7, at a location where a shape-fixed medicine 29 is placed, the second rotating roller 10 is rotated such that its outer circumferential surface is moved from a side adjacent to the first rotating roller toward a side opposite to the first rotating roller, while the first rotating roller 9 is rotated such that its outer circumferential surface is moved from a side opposite to the second rotating roller 10 toward the second rotating roller. In other words, in case where the second rotating roller 10 is positioned at a left side of the first rotating roller 9, the first rotating roller 9 and the second rotating roller 10 are rotated counterclockwise. As shown in FIG. 7, in case where the second rotating roller 10 is positioned at a right side of the first rotating roller 9, the first rotating roller 9 and the second rotating roller 10 are rotated clockwise. In this state, the supplied shape-fixed medicine 29 makes contact with the first rotating roller 9 and the second rotating roller 10. As used herein, the shape-fixed medicine 29 includes a capsule medicine, a suppository or the like other than a tablet, and means a medicine capable of maintaining a fixed pharmaceutical form.

Figure 6:
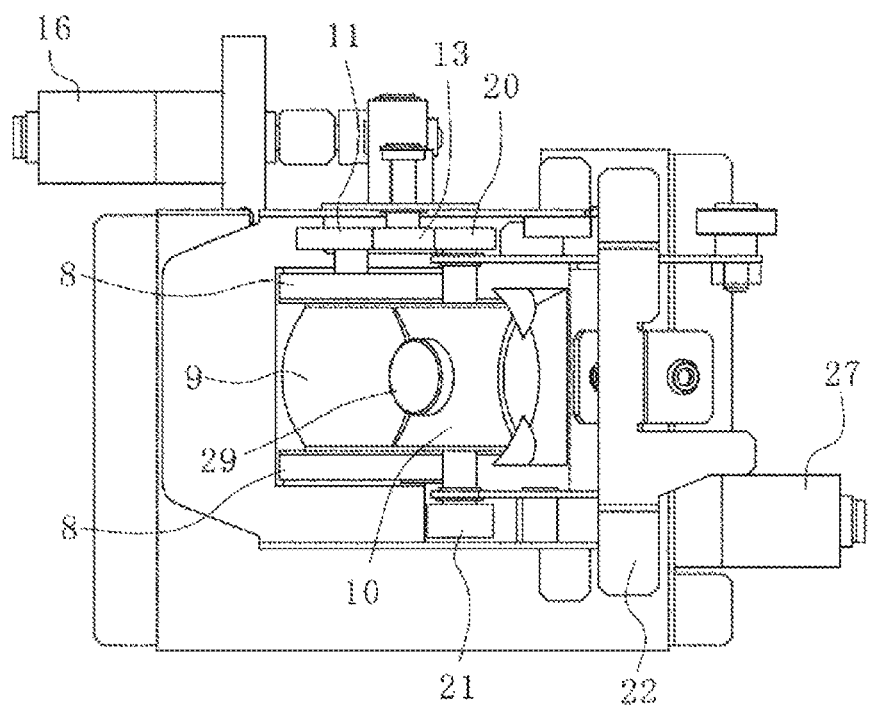
FIG. 6 is a plan view of the device shown in FIG. 3.

As described above, the rotation center O2 of the second rotating roller 10 is located above the position of the rotation center O1 of the first rotating roller 9. When this case is compared with a case where the rotation center O2 of the second rotating roller 10 has the same height as the rotational center O1 of the first rotating roller 9, a contact position T1 between the first rotating roller 9 and the shape-fixed medicine 29 is closer to the rotation center O1 than a gravity center position C of the shape-fixed medicine 29 in a horizontal direction. Therefore, even if the second rotating roller 10 is rotated, the shape-fixed medicine 29 is not allowed to cross over the second rotating roller 10 and to move further. Further, a guide wall may be provided above the second rotating roller 10. This makes it possible to reliably prevent the shape-fixed medicine 29 from crossing over the second rotating roller 10. Further, due to the rotation of the first rotating roller 9 and the second rotating roller 10 in the same direction, the shape-fixed medicine 29 is rotated in place. If the shape-fixed medicine 29 is a tablet, a shape-fixed medicine identifier (for specifying a type of the shape-fixed medicine), which is formed in a surface of the tablet by engraving or printing, appears periodically. If the shape-fixed medicine 29 is a capsule medicine, the shape-fixed medicine identifier formed in a surface of the capsule medicine by printing appears periodically. Further, as shown in FIG. 6, an external dimension of the first rotating roller 9 gradually increases from both ends to the central portion in the axial direction. Thus, the rotation of the first rotating roller 9 applies a force such that the shape-fixed medicine 29 is positioned at the central portions of the first rotating roller 9 and the second rotating roller 10 in the axial directions of the first rotating roller 9 and the second rotating roller 10. Thus, the shape-fixed medicine identifier formed in the shape-fixed medicine 29 can always be positioned within an imaging range of a camera 4 which is described below. Further, the imaging range of the camera 4 is the central portions in the axial direction of the first rotating roller 9 and the second rotating roller 10 on the upper surfaces of the first rotating roller 9 and the second rotating roller 10.

Figure 2:
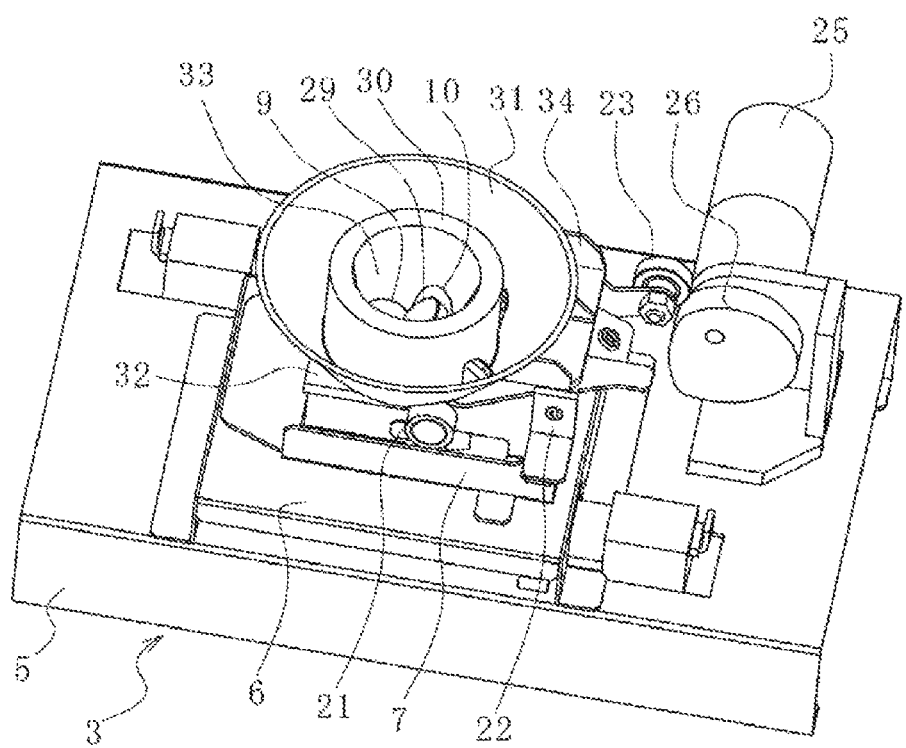
FIG. 2 is a perspective view showing a state where a camera is removed from FIG. 1.

As shown in FIG. 2, a light guide member 30 and a reflection member 31, which is disposed at an outer periphery of the light guide member, are disposed above the first rotating roller 9 and the second rotating roller 10. The light guide member 30 is obtained by forming a light-transmitting material such as acrylic resin (preferably a colorless and transparent material) into a substantially cylindrical shape. An extension portion 32 is formed at a lower end of the light guide member 30, and a portion of the extension portion 32 extends radially outward. The extension portion 32 is fixed to an upper end surfaces of the support plates 8, which are located at both sides, through a screw. The light guide member 30 forms a receiving space 33 for the supplied shape-fixed medicine 29 above the first rotating roller 9 and the second rotating roller 10. Due to the light guide member 30 disposed above the first rotating roller 9 and the second rotating roller 10, when the shape-fixed medicine 29 tries to cross over the second rotating roller 10, the shape-fixed medicine 29 makes contact with an inner circumferential surface of the light guide member 30 and can be prevented from moving further and falling down from the first rotating roller 9 or the second rotating roller 10. Therefore, it is possible to reduce diameter dimensions of the first rotating roller 9 and the second rotating roller 10 to a necessary minimum value. In this case, the light guide member 30 functions as a guide wall. Further, the light guide member 30 can irradiate light, which is outputted from LEDs 42 (these are described below) and reflected by the reflection member 31, on the shape-fixed medicine 29 rotated by the first rotating roller 9 and the second rotating roller 10, from a obliquely upper side or a lateral side.

The reflection member 31 is obtained by forming a thin plate into a shape which has a conical inner surface with an opened area gradually narrowing downward. At least the conical inner surface is comprised of a mirror surface and is formed such that an inclination angle thereof with respect to a horizontal plane is greater than 45° (about 60° in the present embodiment). The reflection member 31 reflects the light emitted vertically downward from the LEDs 42 and directs the light to a center position. Thus, the light can be irradiated on the shape-fixed medicine 29 supported on the first rotating roller 9 and the second rotating roller 10 through the light guide member 30 from the obliquely upper side or the lateral side. Therefore, in case where the shape-fixed medicine 29 is a tablet and the shape-fixed medicine identifier is formed in the surface of the tablet by an engraving, such an engraving can stand out boldly and an imaged image obtained by imaging can be brought into a state where the engraving is clearly displayed. Further, the reflection member 31 is fixed, through a screw, to an upper surface of the third assistance plate 22 through a connection member 34 which is integrated with a portion of an upper outer circumferential surface of the reflection member.

As shown in FIGS. 3 and 5, guide members 35 are disposed at both end portions of the first rotating roller 9 and the second rotating roller 10, respectively. The guide members 35 have a shape of a thin plate and are supported by the support plates 8 so as to be pivotable about a support shaft. Each of the guide members 35 is formed with a cutout portion 35a which has a constant width and extends inward from an outer peripheral edge. Both end portions of the rotating shaft of the second rotating roller 10 are slidably disposed in the respective cutout portions 35a of the guide members 35. When the second rotating roller 10 is pivoted through the eccentric cam 26, the rolling roller 23, the first pivoting arm 18 and the second pivoting arm 19 by driving the second motor 25, the rotating shaft of the second rotating roller 10 slides along the cutout portions 35a of the guide members 35, thereby pivoting the guide members 35. As a result, the second rotating roller 10 is moved away from the first rotating roller 9, thereby forming gaps located not only at a lower side but also at both end sides between the first rotating roller 9 and the second rotating roller 10. However, the guide members 35 can close the gaps located at both end sides from which the shape-fixed medicine 29 should not fall down.

(1-2. Camera 4)

Figure 8:
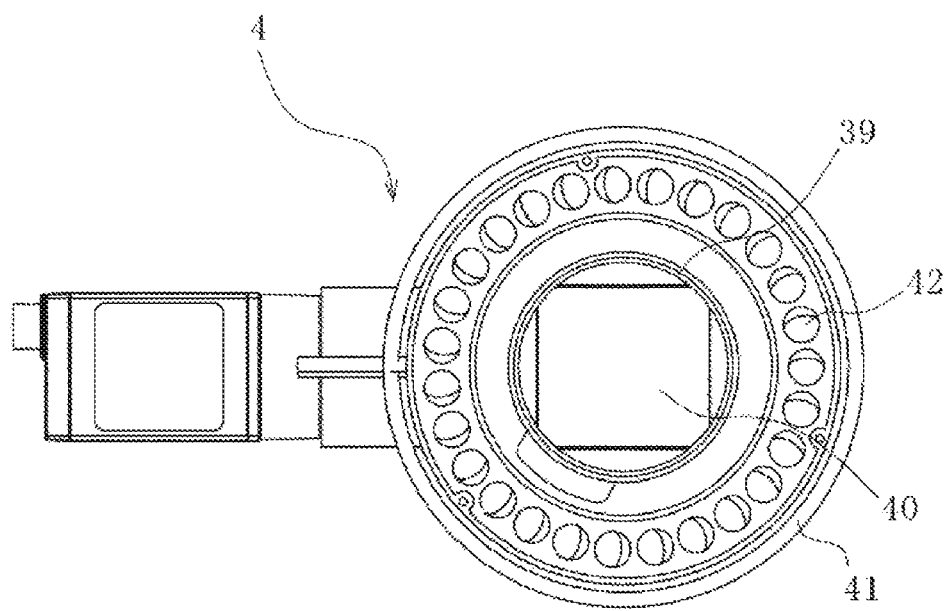
FIG. 8 is a bottom view showing the camera shown in FIG. 1.

As shown in FIG. 1, the camera 4 is fixed to an upper end portion of a support body 5a which has a shape of a frame having a rectangular cross section and extends upward from the base plate 5. The camera 4 protrudes horizontally from the support body 5a. As shown in FIG. 8, the camera 4 is configured such that a light-receiving plane of an imaging element 40 faces downward at a distal end portion of the camera 4.

A first plate 36 and a second plate 37 are fixed to a side surface of the support body 5a one above another. A rectangular opening is formed in the first plate 36, and a third plate 38 is fixed to the rectangular opening. A circular opening is formed in the third plate 38, and a tubular body 39 is inserted through the circular opening. A flange portion 39a formed at an upper end of the tubular body 39 is fixed to an upper surface of the third plate 38, thereby limiting an imaging range of the imaging element 40. Legs (not shown) fixed to the second plate 37 are formed at four corners of the third plate 38. The legs form a gap between the first plate 36 and the second plate 37.

A circular opening portion is formed in the second plate 37 and a ring member 41 is fixed to the circular opening portion. An illumination means is disposed inside the ring member 41. In the present embodiment, a plurality of annularly-arranged LEDs 42 are used as the illumination means. The LEDs 42 consist of a first illumination group and a second illumination group. The first illumination group emits light toward the reflection member 31. The reflection member 31 reflects the light to illuminate the shape-fixed medicine 29 supported by the first rotating roller 9 and the second rotating roller 10 from the obliquely upper side or the lateral side. Further, the light reflected by the reflection member 31 passes through a center of the light guide member 30 and reaches the shape-fixed medicine 29 supported by the first rotating roller 9 and the second rotating roller 10. The second illumination group is located inside the light guide member 30 and directly illuminates the shape-fixed medicine 29 supported by the first rotating roller 9 and the second rotating roller 10.

2. Operation

Next, descriptions are made as to the operation of the medicine inspection assistance device 1 configured as described above. If the shape-fixed medicine 29 subject to inspection is supplied to the medicine support part 3, then the first motor 16 is driven to rotate the driving gear 12 through the driving magnet 17 and the driven magnet 15. Therefore, the driven gear 11 meshing with the driving gear 12 is rotated and the first rotating roller 9 is rotated thereby. Further, by interposing the intermediate gear 13, the second rotating roller 10 is rotated in the same direction as the first rotating roller 9.

First, descriptions are made as to a case where the shape-fixed medicine 29 to be supplied is a tablet (a tablet whose shape-fixed medicine identifier is formed in a surface by engraving) (hereinafter, it is referred to as an engraving tablet). As described above, the first rotating roller 9 has the outer circumferential surface which swells most at the central portion in the axial direction. Accordingly, the engraving tablet is moved to the central portion by the rotation of the first rotating roller 9. Further, the rotation center of the second rotating roller 10 is disposed above the rotation center of the first rotating roller 9, and the first rotating roller 9 has the outer circumferential surface which swell most at the central portion in the axial direction. Therefore, the engraving tablet is inclined in a state where the its outer peripheral surface is in contact with both the first rotating roller 9 and the second rotating roller 10. By rotating the first rotating roller 9 and the second rotating roller 10 in the same direction, the engraving tablet is rotated in place and the front and back surfaces of the engraving tablet alternately face the light-receiving plane of the imaging element 40 of the camera 4. Further, the light emitted from the LEDs 42 of the first illumination group is reflected by the reflection member 31 and is illuminated on the engraving tablet through the light guide member 30 from the obliquely upper side or the lateral side.

At this time, the imaging of the camera 4 is started. In this imaging, a series of rotational motions of the tablet are recorded by continuous imaging. And, only the image, in which the engraving formed on any one of the front and back surfaces of the engraving tablet is imaged, is extracted from the imaged images. It is conceivable to extract, among the imaged images, an image in which a size of the engraving tablet 29 become maximum in a direction orthogonal to a rotation center line of the first rotating roller 9 or the second rotating roller 10. Thus, it is possible to extract an image in which the engraving is imaged in a state where the engraving is most similar to an engraving obtained when one surface of the engraving tablet is viewed in a plan view. Thus, it is possible to easily specify the engraving. Further, the medicine inspection assistance device 1 stores in advance information which associates each shape-fixed medicine 29 with the shape-fixed medicine identifier formed in each shape-fixed medicine 29. Then, based on the extracted image and the shape-fixed medicine identifier stored in association with the engraving tablet designated by the prescription data, it is determined whether the image-captured engraving tablet is the shape-fixed medicine 29 designated by the prescription data. This determination may be made based on a coincidence rate between the shape-fixed medicine identifier and the engraving appearing in the extracted image. Further, for example, by displaying the engraving of the image-captured engraving tablet and the shape-fixed medicine identifier of the engraving tablet designated by the prescription data in a screen side by side, a user can determine whether the engraving of the imaged engraving tablet coincides with the shape-fixed medicine identifier of the engraving tablet designated by the prescription data. In this case, it is preferable to facilitate the comparison by displaying medicine data such as a medicine name, a photograph and the like. Further, when the coincidence rate is low, it is more preferable to notify such a fact by altering a display color or the like.

Next, descriptions are made as to a case where the shape-fixed medicine 29 to be supplied is a capsule medicine or a tablet (a tablet whose shape-fixed medicine identifier is formed by printing) (hereinafter, it is referred to as a print tablet). If a capsule medicine or a print tablet is supplied to the receiving space 33 formed by the first rotating roller 9, the second rotating roller 10 and the light guide member 30, the rotation of the first rotating roller 9 and the second rotating roller 10 is started. The capsule medicine makes contact with the first rotating roller 9 at a central portion and makes contact with the second rotating roller 10 at both end portions. By the rotation of the first rotating roller 9, the capsule medicine is positioned in the central portion of the first rotating roller 9. The print tablet is positioned in the same manner as the engraving tablet. Further, the capsule medicine or the print tablet is also rotated due to the rotation of the first rotating roller 9 and the second rotating roller 10. Thus, a state where the print on the surface faces the light-receiving plane of the imaging element 40 of the camera 4 is obtained.

In this case, light is irradiated from the LEDs 42 of the second illumination group and is directly illuminated on the surface of the capsule medicine or the print tablet. Thus, it is possible to image the print formed in the surface of the capsule medicine by the camera 4 in a good condition. Similar to the case of the tablet, for example, by displaying the extracted print and the shape-fixed medicine identifier of the capsule medicine or the print tablet designated by the prescription data side by side in the screen, a user can determine the imaging result, i.e. whether the extracted print coincides with the shape-fixed medicine identifier of the capsule medicine or the print tablet designated by the prescription data. Instead of the user, the medicine inspection assistance device 1 may determine the coincidence or non-coincidence.

After the imaging of the shape-fixed medicine 29 is terminated in this manner, the second motor 25 is driven to move the second rotating roller 10 away from the first rotating roller 9, thereby forming a gap. The shape-fixed medicine 29 is discharged downward through the gap. At this time, the second rotating roller 10 is rotated by the third motor 27 in a direction opposite to the rotation direction of the first rotating roller 9. That is to say, by rotating both the first rotating roller 9 and the second rotating roller 10 in a direction of being discharged from the formed gap, it is possible to smoothly perform the discharging operation of the shape-fixed medicine 29. Further, the guide members 35 are also pivoted along with the pivoting motion of the second rotating roller 10, thereby covering both lateral side portions of the formed gap. Therefore, the shape-fixed medicine 29 does not fall down to the lateral sides.

Further, in the above-described embodiment, the LEDs 42 are disposed above the first rotating roller 9 and the second rotating roller 10. However, the reflection member 31 may become unnecessary by disposing the LEDs 42 at the lateral side (at the obliquely upper side).

Further, the above-described embodiment has been described as to the example where the first rotating roller 9 and the second rotating roller 10 are disposed such that their axises are parallel with each other. However, for example, the first rotating roller 9 and the second rotating roller 10 may be disposed such that their axial directions are gradually spread apart from one end toward the opposite end. In this case, if the outer circumferential surfaces of the first rotating roller 9 and the second rotating roller 10 are formed in a conical shape, then the shape-fixed medicine 29 to be rotated can be moved toward the one end where a diameter dimension becomes smaller. Therefore, a guide surface may be formed at the one end and the camera 4 may image such a position.

3. Application Example

Figure 9:
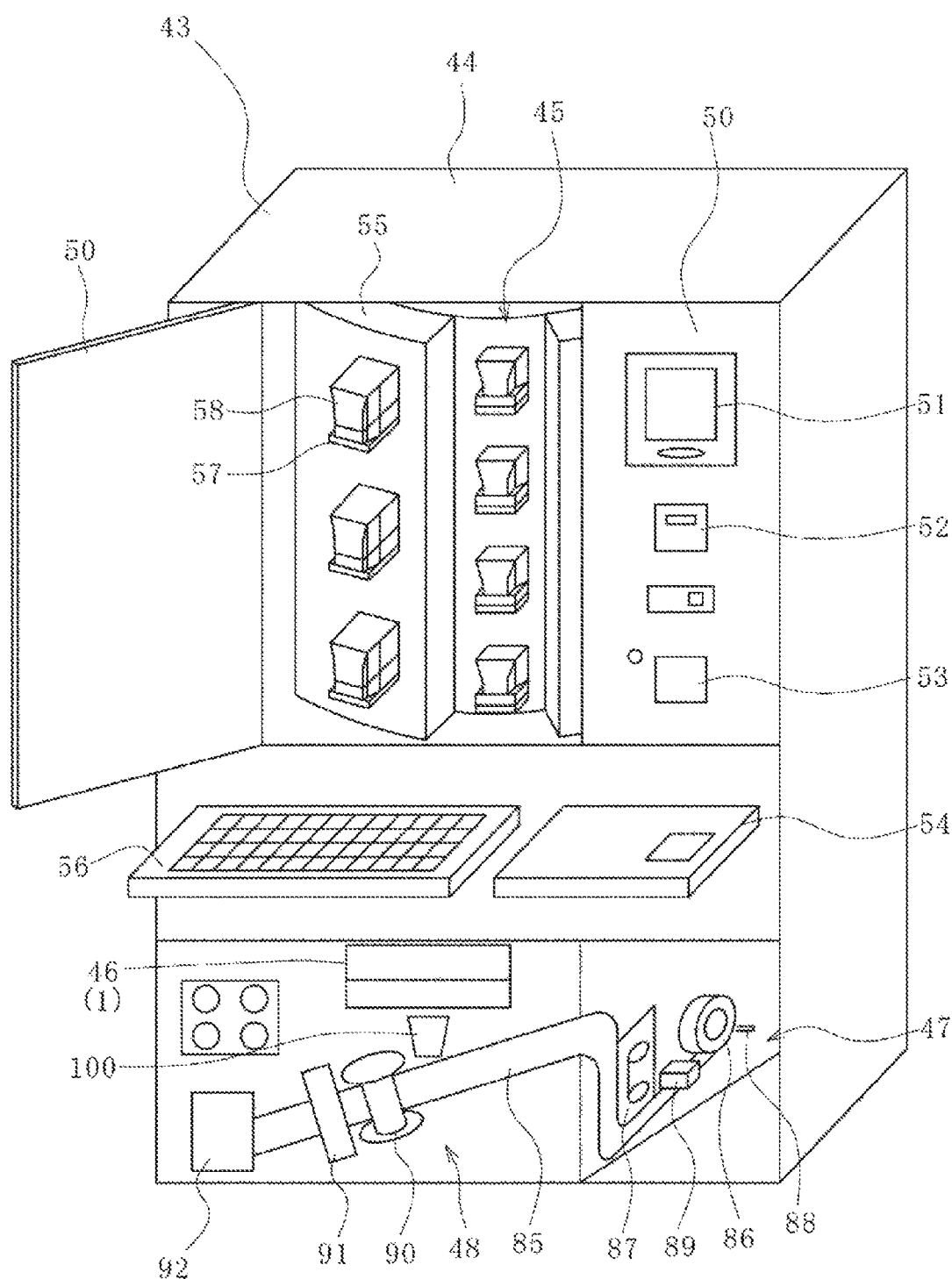
FIG. 9 is a perspective view of a medicine packing device according to the present embodiment.

FIG. 9 shows a medicine packing device 43 which employs the medicine inspection assistance device 1 according to the present embodiment. The medicine packing device 43 generally includes, in a device body 2, a medicine supply unit 45, a medicine inspection assistance unit 46, a printing unit 47, a packing unit 48 and a control unit 49 (see FIG. 11). Further, with regard to the medicine inspection assistance device 1 of the medicine inspection assistance unit 46, the medicine support part 3, the camera 4, a supply means for moving the first rotating roller 9 and the second rotating roller 10 away from each other to supply a tablet from the medicine support part 3 to the packing unit 48, and a sensor 103 (a detection means) are disposed inside the medicine packing device 43. A specification means configured to specify a shape-fixed medicine identifier from imaged images of the shape-fixed medicine, which are imaged by a first camera 64 and a second camera 66 (these are described below), may be or may not be disposed inside the medicine packing device 43. In case where the specification means is not disposed inside the medicine packing device 43, a computer and the like, which is connected to the imaging means so as to transmit or receive the imaged images via a network, may be equipped with the specification means. An example of such a computer may be a computer provided with a monitor and used by a final inspector. The final inspector can check the shape-fixed medicine identifier specified by the specification means on the monitor.

(3-1. Device Body 44)

The device body 44 is provided with hinged doors 50 at an upper portion and is configured such that a medicine cassette 58 can be attached to and detached from the medicine supply unit 45 disposed in the device body. A touch panel 51, a bar code reader 52 and a journal printer 53 are provided in one of the doors 50 (a right door in FIG. 9). Further, the device body 44 is provided with a manual distribution medicine supply part 56, which is described below, and a replenishment table below the doors 50.

(3-2. Medicine Supply Unit 45)

The medicine supply unit 45 includes an automatic medicine supply part 55 and a manual distribution medicine supply part 56.

In the automatic medicine supply part 55, motor bases 57 are vertically and circumferentially provided on a substantially cylindrical cylinder, and medicine cassettes 58 can be attached to and detached from the respective motor bases 57. The details of the motor base 57 are not shown. The motor base 57 is configured to house a motor and to transmit power to a rotor of the medicine cassette 58 through gears. Further, in the automatic medicine supply part 55, medicine passages (not shown) are provided with respect to the respective rows of the medicine cassettes 58 arranged in a vertical direction. Due to those medicine passages, the shape-fixed medicines 29 dispensed from the medicine cassettes 58 are smoothly guided downward. Further, a counting sensor (not shown) for detecting the number of the dispensed tablets is provided at a portion of the medicine passage which communicates with a cassette discharge opening.

Each of the medicine cassettes 58 has a shape of a substantially rectangular parallelepiped box and receives the same type of shape-fixed medicines 29 managed with a lot number. A rotor (not shown) is provided inside the medicine cassette 58 and a plurality of pocket portions is formed in an outer circumferential portion of the rotor. The shape-fixed medicines 29 received inside the medicine cassette 58 are retained one by one in the respective pocket portions. A drive force of the motor provided in the motor base 57 is transmitted to the rotor, rotating the rotor. As the rotor is rotated, the shape-fixed medicines 29 retained in the pocket portions are sequentially dispensed toward the medicine passages. The shape-fixed medicines 29 dispensed to the medicine passages are moved downward along the medicine passages under a gravity force and are supplied to the medicine support part 3 of the medicine inspection assistance unit 46 through a first hopper 59 (see FIG. 12).

Figure 11:
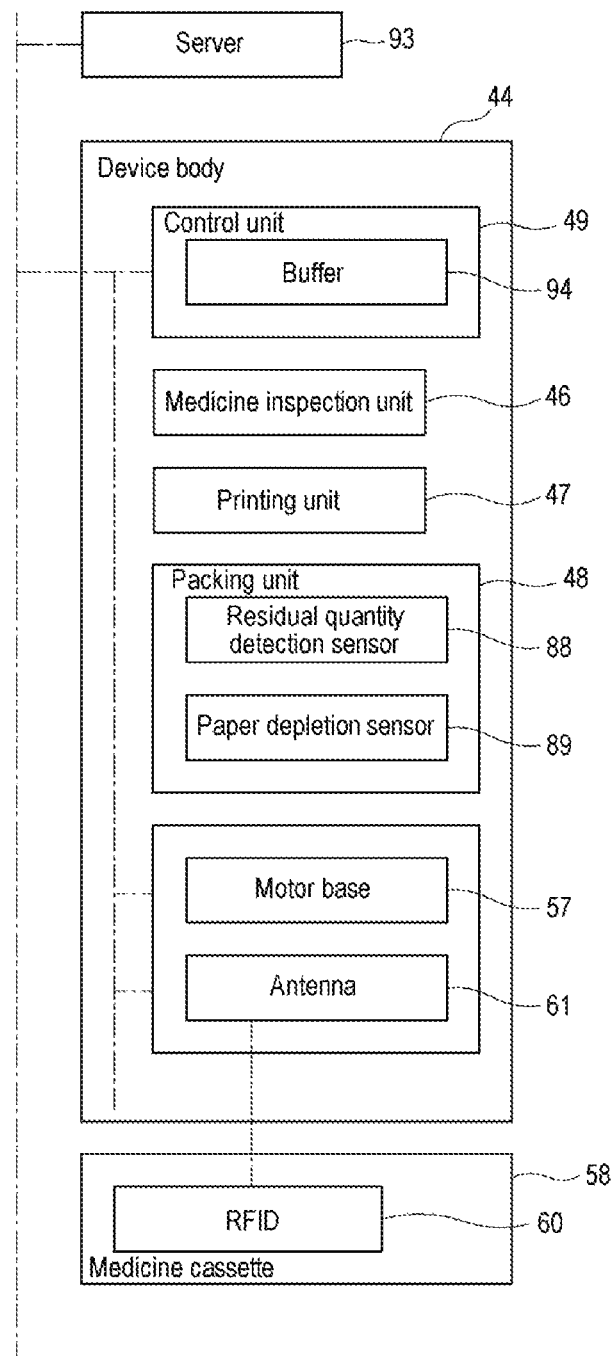
FIG. 11 is a block diagram of the medicine packing device shown in FIG. 9.

As shown in FIG. 11, each of the medicine cassettes 58 is provided with an RFID (Radio Frequency Identification) 60. Information on the shape-fixed medicine 29 to be received (medicine information such as a name of a shape-fixed medicine 29, the number of the received shape-fixed medicines, a shape-fixed medicine identifier, etc.) is stored in the RFID 60. An antenna 61 is provided at each of the motor bases 57 to enable the motor base to communicate with the RFID 60 of the medicine cassette 58. Dispensing information of the shape-fixed medicine 29 (a quantity of dispensed shape-fixed medicines 29, a stock quantity of the shape-fixed medicines remaining in the medicine cassette 58, an identification number of a shelf to which the medicine cassette 58 is mounted, etc.) is read out from the RFID 60 through the antenna 61 and is then stored in a buffer 94 of the control unit 49 which is described below.

As shown in FIG. 9, the shape-fixed medicines 29 that cannot be automatically dispensed (for example, half-tablets, etc.) are manually distributed to respective cells of the manual distribution medicine supply part 14, which are formed in a grid shape, per unit of one pack (a manual distribution task). The manual distribution medicine supply part dispenses the shape-fixed medicines to a second hopper 62 of the medicine inspection assistance unit 46 by sequentially opening bottoms of the cells. Further, instructions on which shape-fixed medicine 29 is manually distributed to which location are printed by the journal printer 53 based on prescription data.

(3-3. Medicine Inspection Assistance Unit 46)

Figure 10:
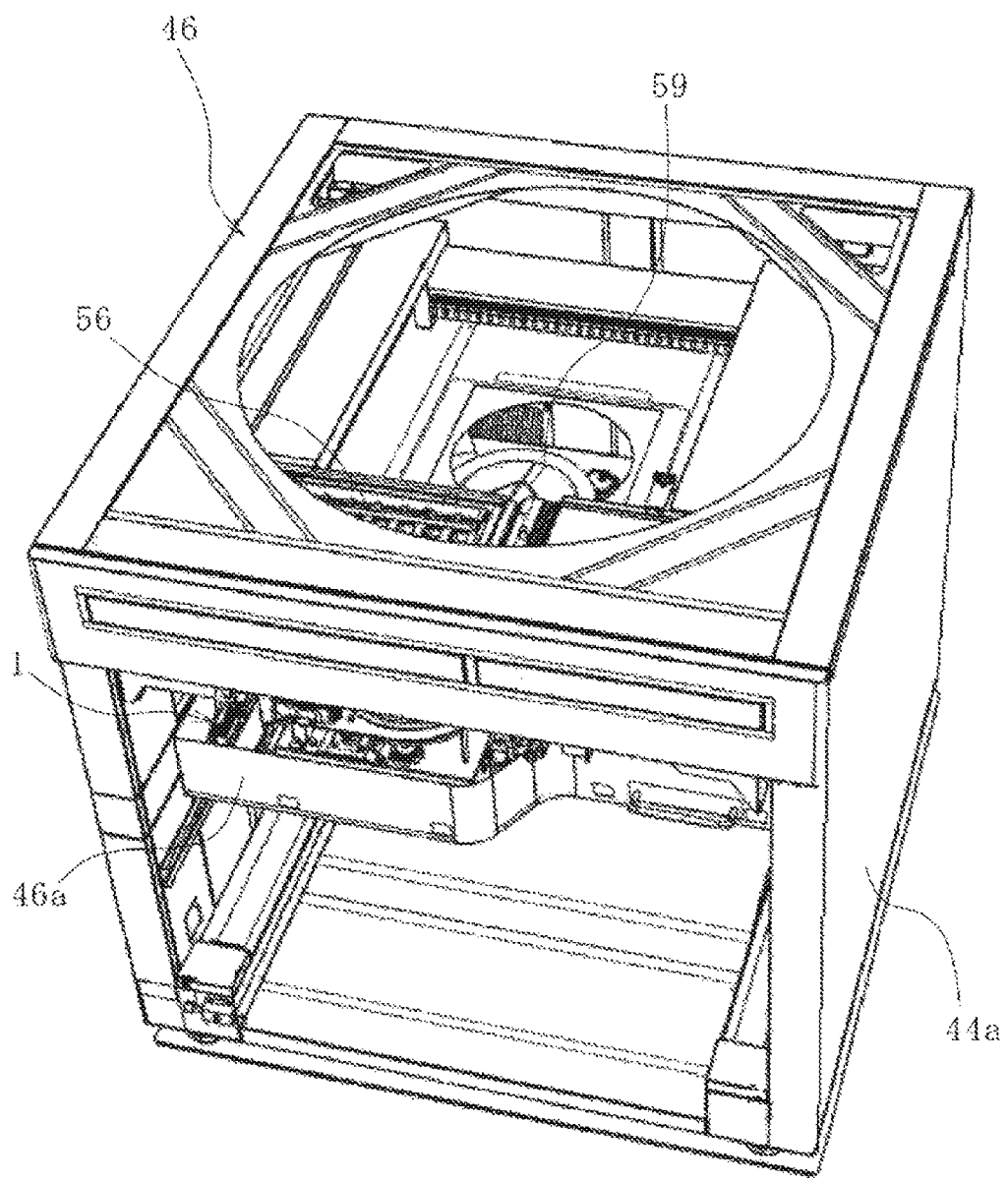
FIG. 10 is a perspective view showing a medicine inspection assistance unit shown in FIG. 9.
Figure 13:
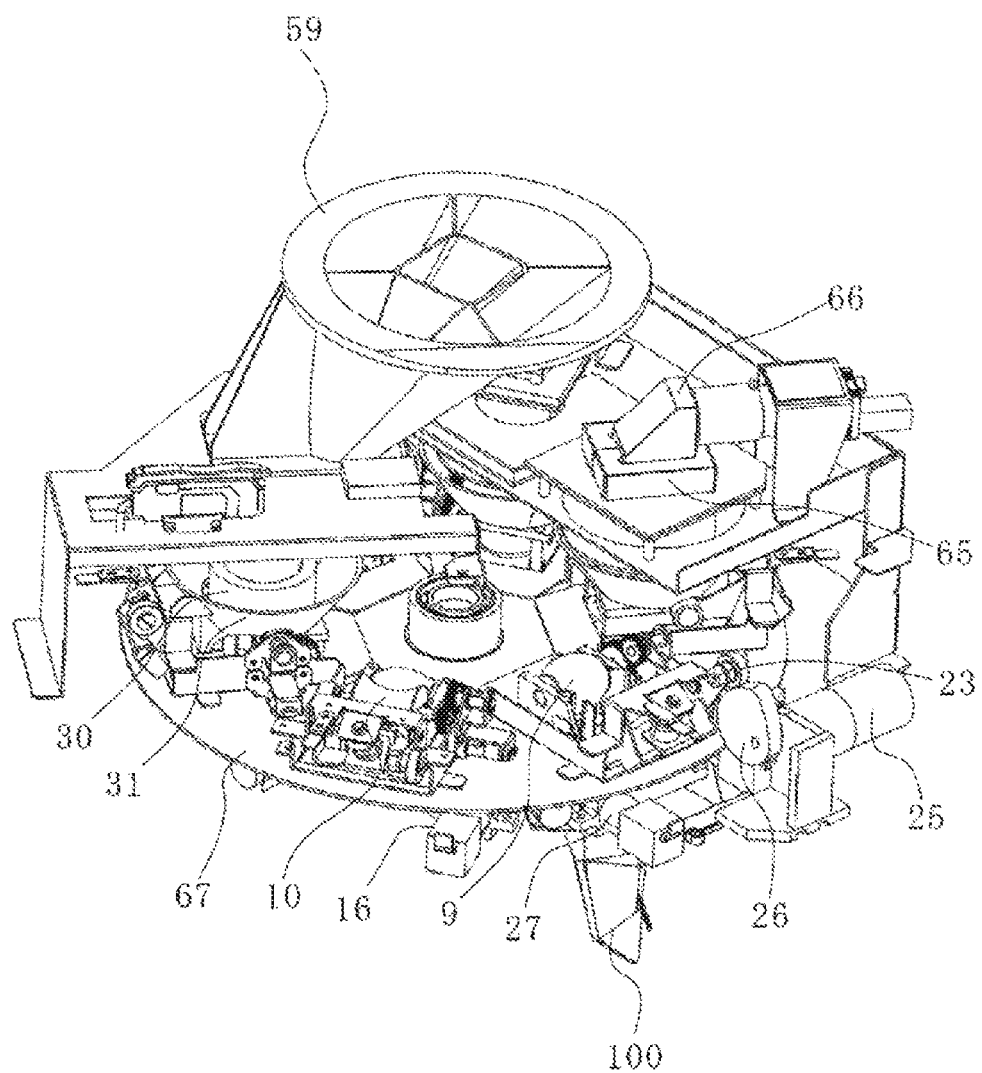
FIG. 13 is a perspective view showing a state where a second hopper is removed from FIG. 12.
Figure 14:
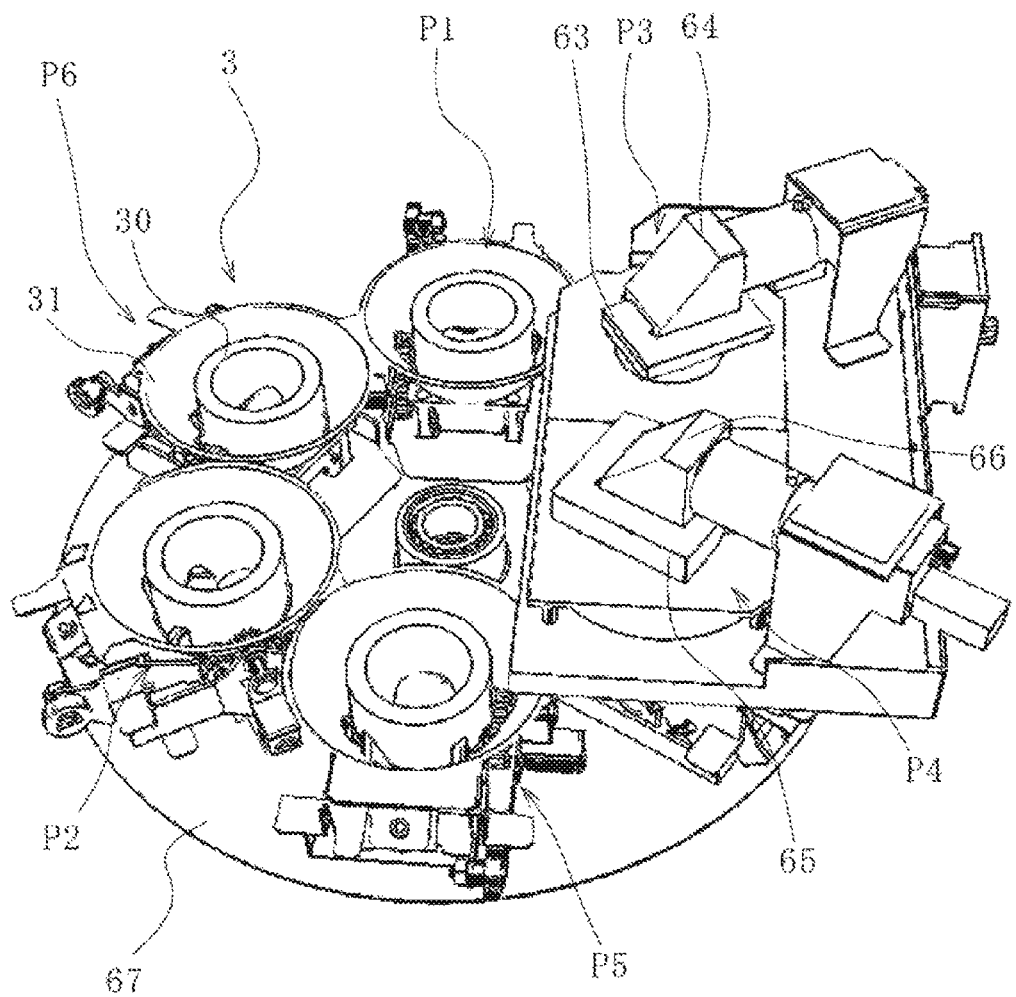
FIG. 14 is a perspective view showing a state where a first hopper and a medicine separation part are removed from FIG. 13.

As shown in FIG. 10, the medicine inspection assistance unit 46 has a configuration in which the medicine inspection assistance device 1 is provided on a shelf member 46a installed in a frame body 44a such that the shelf member 46a can be drawn out from the frame body 44a. The medicine inspection assistance device 1 includes a medicine imaging part 2 in which the medicine support parts 3 having the same configuration as that shown in FIG. 3 are provided at six locations. For example, as shown in FIGS. 13 and 14, the medicine support parts 3 are disposed at equal spacings at six locations around a central axis. Further, in the descriptions made below, with regard to the configuration of the medicine support part 3, corresponding parts are given corresponding reference numerals and the descriptions on the corresponding parts are omitted, since the configuration of the medicine support part 3 is substantially the same as that shown in FIG. 3.

The medicine support parts 3 located at six locations are supported by a disk-shaped rotary plate 67. Although not shown in the drawings, the rotation of the rotary plate 67 may be carried out, for example, by bring a roller into contact with an outer circumferential edge of the rotary plate 67 and rotating the roller through the driving of a motor or the like. In the present embodiment, the rotary plate 67 is intermittently rotated by 60°. Each of the medicine support parts 3 is sequentially rotated and is positioned in a first medicine supply position, a second medicine supply position, a first medicine imaging position, a second medicine imaging position, a medicine discharge position and a spare position.

(3-3-1. First Medicine Supply Position P1)

Figure 12:
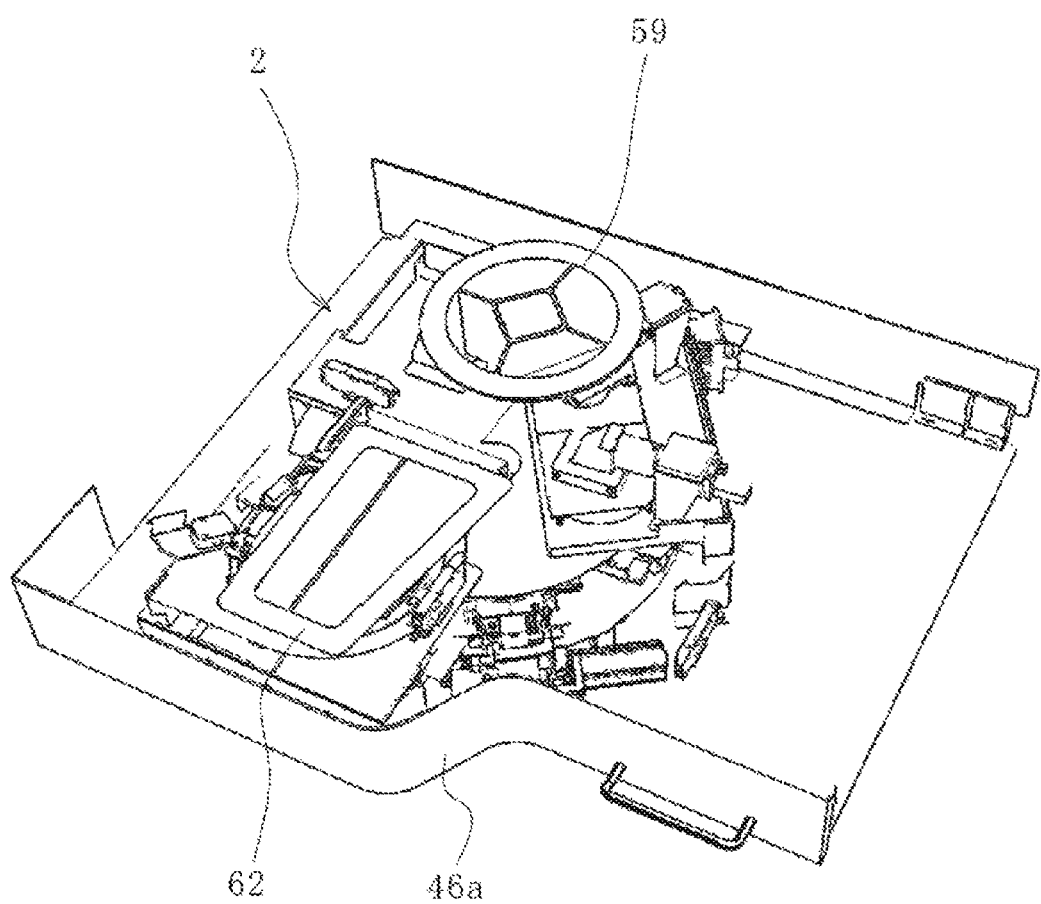
FIG. 12 is a perspective view showing a medicine imaging part shown in FIG. 10.

As shown in FIG. 12, in the first medicine supply position P1, the first hopper 59 is disposed above the medicine support part 3. The shape-fixed medicines 29 supplied from the respective medicine cassettes 58 of the automatic medicine supply part 55 are collected in the first hopper 59 and are supplied one by one to the medicine support part 3 positioned at the first medicine supply position P1. Further, the first motor 16 attached to the shelf member 46a is disposed at a lower side of the medicine support part 3. By the driving of the first motor 16, the first rotating roller 9 and the second rotating roller 10 are rotated so that the supplied shape-fixed medicine 29 can be rotated. In particular, the rotation of the first rotating roller 9 and the second rotating roller 10 in this position is effective. This is because, when a plurality of the shape-fixed medicines 29 are supplied to the medicine support part 3 at a time under a state where the inspection of the shape-fixed medicine 29 is unnecessary, it is possible to prevent a plurality of the shape-fixed medicines 29 from making contact with some member of the medicine packing device 43 located above the medicine support part 3 due to overlapping of a plurality of the shape-fixed medicines 29 on the first rotating roller 9 and the second rotating roller 10.

(3-3-2. Second Medicine Supply Position P2)

In the second medicine supply position P2, the second hopper 62 is disposed above the medicine support part 3. The second hopper 62 is formed such that its opened cross-sectional area gradually decreases toward a discharge opening formed at a lower end. The shape-fixed medicines 29 supplied from the manual distribution medicine supply part 56 are collected in the second hopper 62 and then are supplied to a medicine separation part 68. Thereafter, the shape-fixed medicines 29 are supplied one by one to the medicine support part 3 positioned in the second medicine supply position P2. However, in case where a one pack dosage includes a plurality of the shape-fixed medicines 29, supplying the shape-fixed medicines 29 one by one may be performed with respect to only the first one of such packs. The shape-fixed medicines 29 corresponding to one pack may be collectively supplied with respect to packs subsequent to the first pack, since it is determined that the same type of the shape-fixed medicines 29 are supplied to the packs subsequent to the first pack and the inspection is unnecessary.

Figure 17:
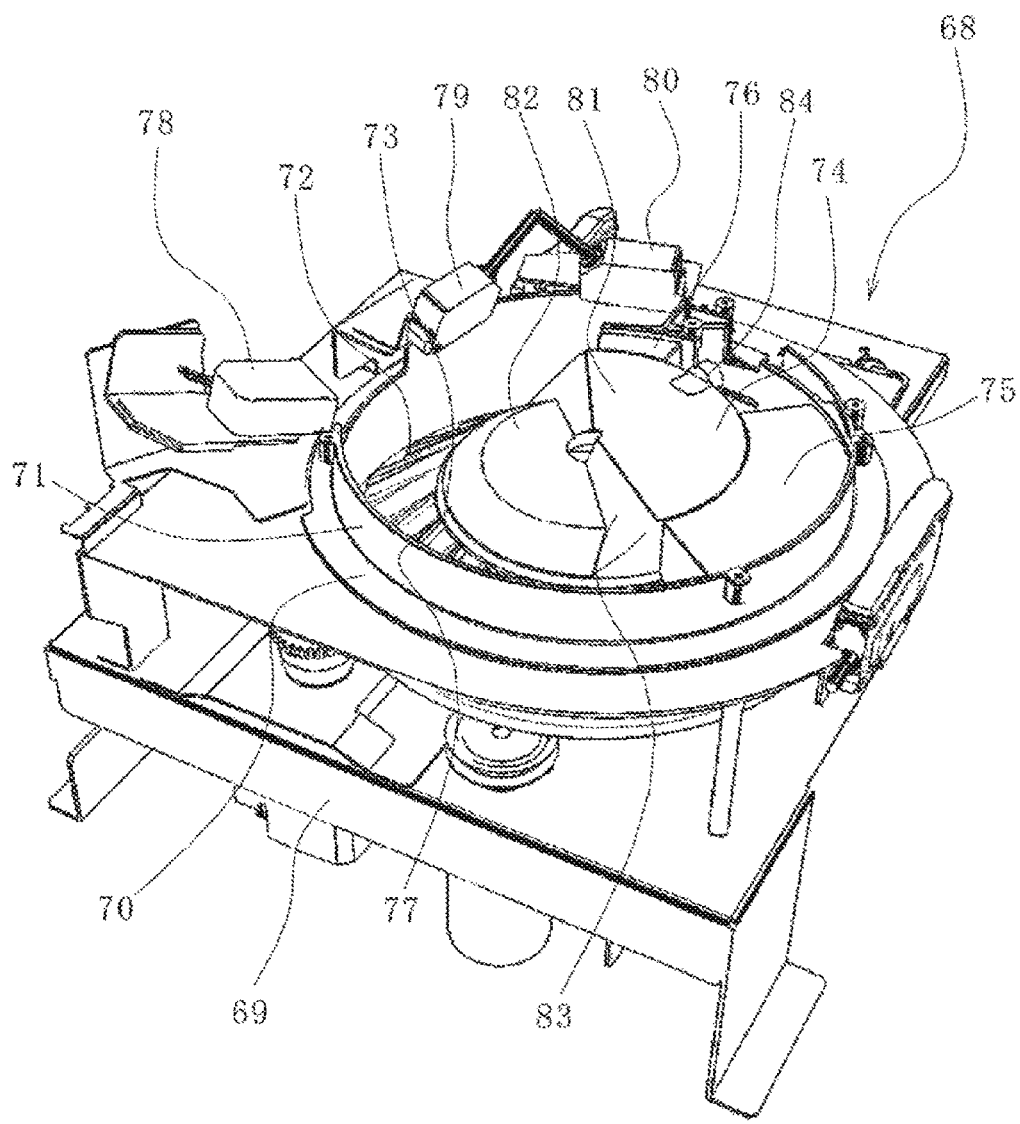
FIG. 17 is a perspective view showing the medicine separation part shown in FIG. 16.

As shown in FIG. 17, the medicine separation part 68 has a configuration in which a receiving tray member 70 for the shape-fixed medicines 29 is disposed on a support body 69.

The receiving tray member 70 is configured with an outer peripheral portion 71, a rotary plate 72 disposed at an inner peripheral side of the outer peripheral portion, a cylindrical portion 73 disposed at an inner peripheral side of the rotary plate, and a rotary body 74 disposed at the inner peripheral side of the cylindrical portion. The rotary plate 72 and the cylindrical portion 73 can be independently rotationally driven in normal and reverse directions by a drive mechanism (not shown) provided on the support body 69. The rotary plate 72 and the rotary body 74 can be rotated intermittently.

A portion of an inner peripheral surface of the outer peripheral portion 71 protrudes radially inward to form a fan-shaped portion 75 extending along a portion of an outer peripheral surface of the rotary body 74. Further, an elastic material such as urethane or the like is adhered to at least the remaining portion of the inner peripheral surface of the outer peripheral portion 71, and a film or the like made of a material having a small coefficient of friction is adhered to an inner surface side of the elastic material. Thus, even if the supplied shape-fixed medicines 29 collide with the outer peripheral portion 71, the shape-fixed medicines 29 are prevented from being damaged and do not receive a frictional resistance due to the rotation of the rotary plate 72. Further, an opening portion (not shown) is formed in a portion of the outer peripheral portion 71 and can be opened and closed by a shutter (not shown). A guide portion 76 for guiding the shape-fixed medicines 29, which are conveyed by the rotary plate 72 as described below, to the opening portion is formed in the vicinity of the opening portion. By opening the shutter, the shape-fixed medicine 29 (a tablet, a capsule medicine or the like having a fixed shape and having an identifier (an engraving or a print) in an outer surface) guided by the guide portion 76 can be discharged to the medicine support part 3 through the opening portion. Further, the shape-fixed medicine 29 discharged through the opening portion is detected by a sensor (not shown), and thus the number of the discharged shape-fixed medicines 29 can be counted.

The rotary plate 72 has a shape of donut. An upper surface of the rotary plate 72 is formed in a conical shape gradually inclined radially outward and downward. The rotary plate 72 and the outer peripheral portion 71 form a conveyance space where the shape-fixed medicine 29 is conveyed in a circumferential direction. Further, on the upper surface of the rotary plate 72, a plurality of ridges 77 extending in a radial direction are formed at equal spacings in the circumferential direction. A width of each of the ridges 77 gradually increases radially outward. Groove portions formed between the ridges 77 have the same width dimension.

The shape-fixed medicine 29, which is conveyed by the rotation of the rotary plate 72, is detected by a first sensor 78, a second sensor 79 and a third sensor 80. The rotation of the rotary plate 72 is controlled based on detection results of the sensors. The first sensor 78 comprises an area sensor and is configured to detect whether the shape-fixed medicine 29 is positioned in a predetermined area on the rotary plate 72. The second sensor 79 and the third sensor 80 detect whether the shape-fixed medicine 29 placed on the rotary plate 72 has passed the second sensor 79 and the third sensor 80 by the rotation of the rotary plate 72. The third sensor 80 is disposed so as to detect the shape-fixed medicine 29 located immediately before the opening portion. The second sensor 79 detects the shape-fixed medicine 29 at an upstream side of the detection position of the third sensor 80.

The cylindrical portion 73 is inclined such that its upper end portion forms a portion of a conical surface along the upper surface of the rotary plate 72. The cylindrical portion 73 functions as a bearing for the rotary plate 72 and the rotary body 74, thus stabilizing the rotating state of the rotary plate 72 and the rotary body 74. Further, the cylindrical portion 73 guides lifting and lowering motions of the rotary body 74.

The rotary body 74 is configured with a first step portion 81 and a second step portion 82. An approximately half portion of an upper surface of the rotary body 74 protrudes upward, forming the first step portion. The remaining approximately half portion of the upper surface of the rotary body 74 forms the second step portion. The second step portion 82 is lower than the first step portion 81 and forms a portion of a truncated cone shape. A boundary portion between the first step portion 81 and the second step portion 82 is an inclined surface 83 which gradually protrudes from an upper surface of the first step portion 81 toward an upper surface of the second step portion 82. The rotary body 74 can be lifted and lowered. When the rotary body 74 is in a lifted position, an outer peripheral portion of the rotary body 74 forms a conical surface together with the rotary plate 72 and the cylindrical portion 73. When the rotary body 74 is in a lowered position, the upper surface of the second step portion 82 and an inner peripheral surface of the cylindrical portion 73 form a retention space where the shape-fixed medicine 29 is temporarily retained. The shape-fixed medicines 29 are supplied from the manual distribution medicine supply part 56 to the retention space through the second hopper 62. By normally and reversely rotating the rotary body 74 in such a state, the shape-fixed medicines 29 supplied to the retention space are dispersed in the circumferential direction. Thus, if the rotary body 74 is moved to the lifted position, then the shape-fixed medicines 29 dispersed in the circumferential direction are further moved radially outward and are moved onto the rotary plate 72 while widening the circumferential distance between the shape-fixed medicines 29. A stopper 84 protrudes from the outer periphery of the first step portion 81. As described above, the rotary body 74 is rotated normally and reversely by a drive mechanism (not shown). When the rotary body 74 is rotated, the stopper 84 makes contact with each of the fan-shaped portion 75 of the outer peripheral portion 71 and the guide portion 76, thereby limiting a range of rotation. However, a sensor may be provided in place of the stopper 84 so that the rotation of the rotary body 74 can be controlled based on a detection signal generated from such a sensor.

In the medicine separation part 68 configured as described above, if the shape-fixed medicines 29 corresponding to one dosage (one cell) are dispensed from the manual distribution medicine supply part 56, then the shape-fixed medicines 29 are guided to the medicine separation part 68 through the second hopper 62. In the medicine separation part 68, as the rotary body 74 is moved to the lowered position, the shape-fixed medicines 29 are temporarily retained in the retention space formed by the upper surface of the second step portion 82 and the inner peripheral surface of the cylindrical portion 73. Then, the rotary body 74 is rotated normally and reversely, thereby moving the retained shape-fixed medicines 29 from the second step portion 82 onto the rotary plate 72. Since the shape-fixed medicines 29 are moved to the radially outward side where a circumferential length becomes longer, a sufficient distance in the circumferential direction can be easily secured between the shape-fixed medicines 29 on the rotary plate 72. In this state, if the rotary plate 72 is rotated, then the shape-fixed medicines 29 are conveyed in the circumferential direction. Thereafter, if the shutter is opened, the shape-fixed medicines 29 are sequentially sent one by one to the medicine support part 3 through the opening portion. Further, a method of conveying the shape-fixed medicines 29 in the medicine separation part 68 is described in detail below.

In the medicine support part 3 located in the second medicine supply position P2, similar to the case of the first medicine supply position P1, the first motor 16 is disposed at a lower side, and the first rotating roller 9 and the second rotating roller 10 are rotated. Accordingly, even in the second medicine supply position P2, the shape-fixed medicines 29 can be rotated by the medicine support part 3.

(3-3-3. First Medicine Imaging Position P3)

As shown in FIG. 14, a first medicine illumination part 63 and a first camera 64, which are for the purposes of imaging, are disposed above the medicine support part 3 of the first medicine imaging position.

(3-3-4. Second Medicine Imaging position P4)

A second medicine illumination part 65 and a second camera 66 are disposed above the medicine support part 3 of the second medicine imaging position.

The first medicine illumination part 63 and the second medicine illumination part 65 have the same configuration as the illumination means described above and include a plurality of LEDs 42 disposed at an upper portion. Light outputted from the respective LEDs 42 of the first medicine illumination part 63 is directly irradiated on the shape-fixed medicine 29 supported by the medicine support part 3. Thus, when the shape-fixed medicine 29 is a print tablet or a capsule medicine, it is possible to bring the shape-fixed medicine 29 into a state where the print formed in the surface can be clearly imaged by the first camera 64. On the other hand, light outputted from the respective LEDs 42 of the second medicine illumination part 65 is reflected by the reflection member 31. Thereafter, the light passes through the light guide member 30 and is irradiated on the shape-fixed medicines 29 supported by the medicine support part 3 from the obliquely upper side or the lateral side. Thus, when the shape-fixed medicine 29 is an engraving tablet, it is possible to bring the shape-fixed medicine 29 into a state where the engraving formed in the surface can be clearly imaged by the second camera 66.

Figure 15:
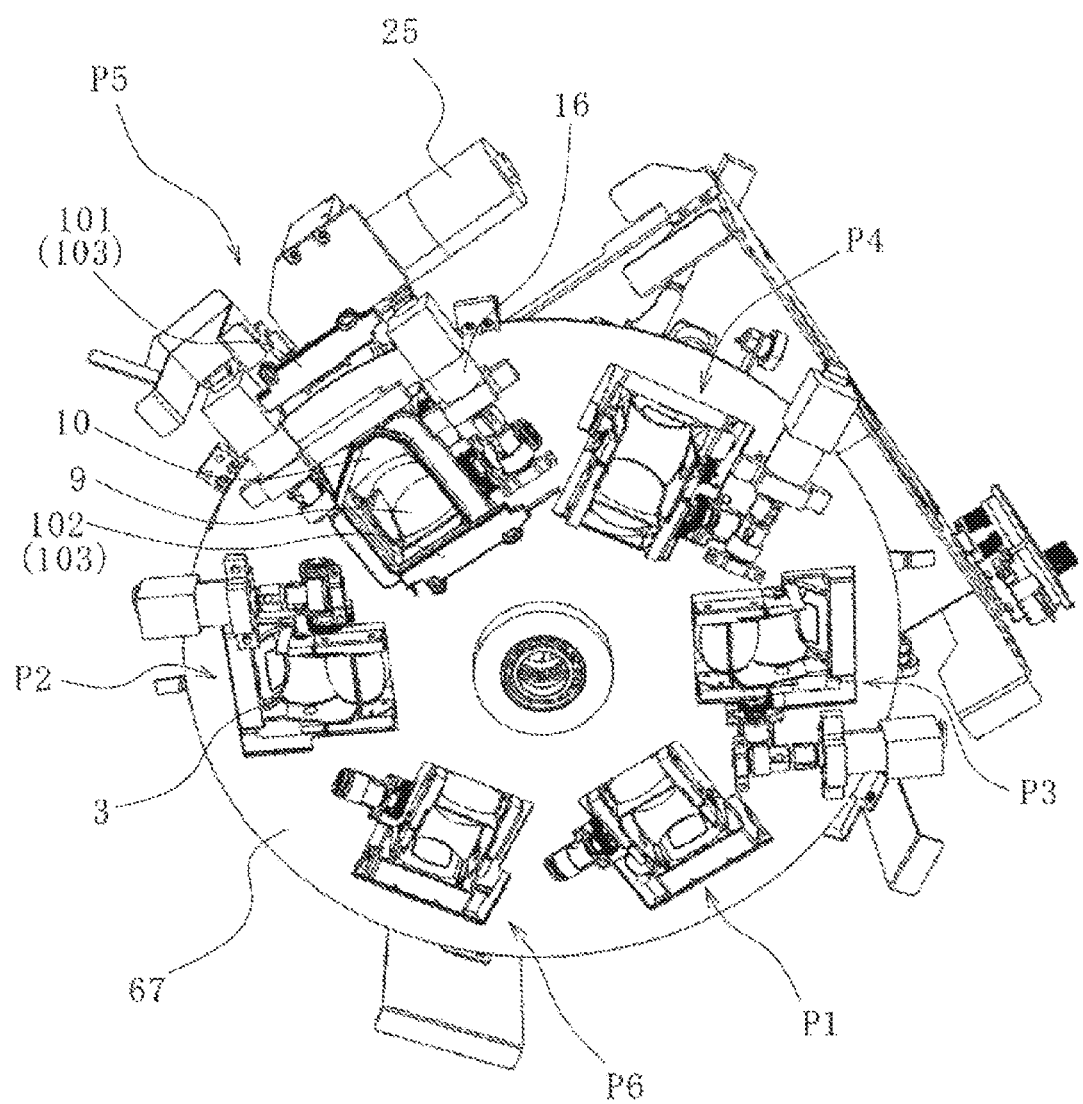
FIG. 15 is a perspective view showing a state where
Figure 16:
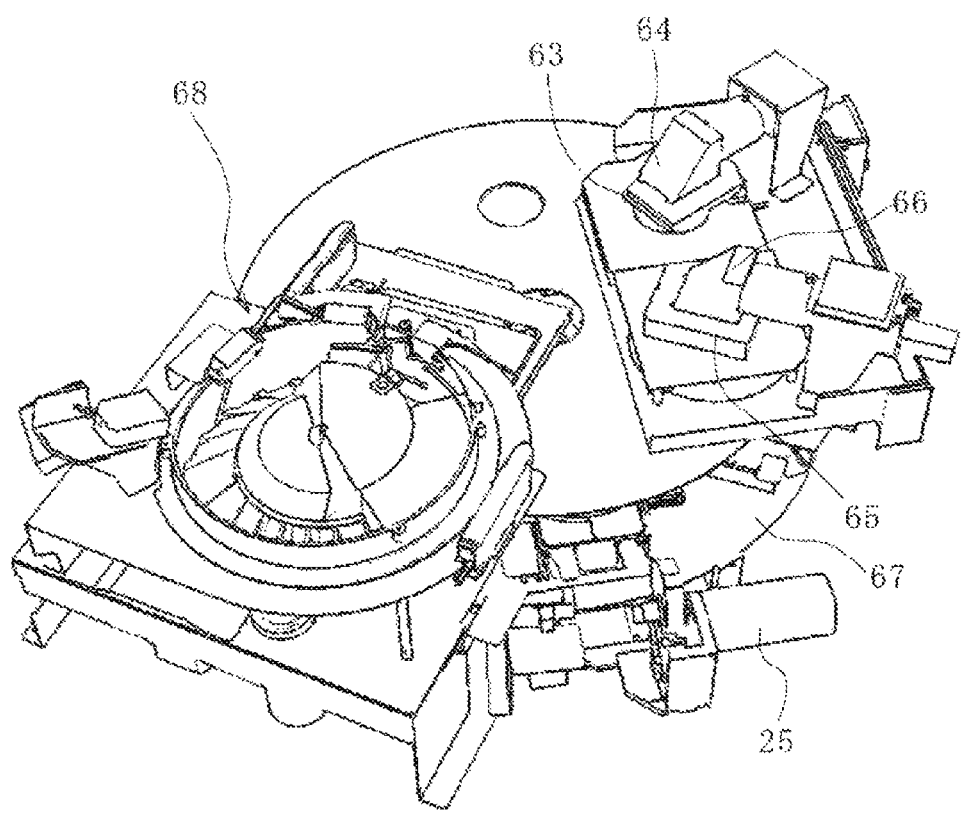
FIG. 16 is a perspective view showing a state where a first hopper is removed from FIG. 13.

As shown in FIG. 15, the first motor 16 is provided in each of the first medicine imaging position P3 and the second medicine imaging position P4. The first motor 16 applies a rotational force to the first rotating roller 9 of the medicine support part 3 and synchronously rotates the first rotating roller 9 and the second rotating roller 10 in the same direction. As a result, the shape-fixed medicine 29 supported by the medicine support part 3 is rotated. Therefore, it is possible to bring the shape-fixed medicine 29 into a state where the shape-fixed medicine identifier such as an engraving or a print can be reliably visually recognized from above.

The first camera 64 and the second camera 66 are configured to image the shape-fixed medicine 29 rotating on the medicine support part 3 from above. In the first medicine illumination part 63, the light emitted from the LEDs 42 from above is directly irradiated on the shape-fixed medicine 29 from above. In the second medicine illuminating part 65, the light emitted from the LEDs 42 is guided to the reflection member 31 and the light guide member 30, whereby the shape-fixed medicine 29 is illuminated from the lateral side. Accordingly, a capsule medicine or a print tablet having a print in the surface thereof can be clearly imaged by the first camera 64, and an engraving tablet having an engraving in the surface thereof can be clearly imaged by the second camera 66.

In this way, due to the first medicine illumination part 63 and the second medicine illumination part 65 which are provided at two locations with respect to the rotating six medicine support parts 3, the light can be appropriately irradiated according to the types of the shape-fixed medicines, and the shape-fixed medicines can be imaged. Therefore, it is not necessary to provide a large number of LEDs 42 and a large number of cameras 4. This makes it possible to manufacture the medicine inspection assistance device at low cost. Further, since the light emitted from the LEDs 42 can be reliably guided by the light guide member 30 and the reflection member 31, it is possible to bring the illuminated state of the shape-fixed medicines 29 into a good state suitable for the imaging. Further, it is possible to shorten the imaging time and to perform efficient inspection assistance. By providing the cameras having different image-capturing methods at two locations, it is possible to simultaneously execute the image-capturing operations whose image-capturing method are different.

(3-3-5. Medicine Discharge Position P5)

In the medicine discharge position, a medicine discharging portion (not shown), the first motor 16 and the second motor 25 are disposed at a lower side of the medicine support part 3, and the third motor 27 is disposed at a lateral side of the medicine support part 3. By the driving of the second motor 25, the second rotating roller 10 is pivoted to move away from the first rotating roller 9, thus forming a gap between the first rotating roller and the second rotating roller. Thus, the shape-fixed medicine 29 falls down from the medicine support part 3 and is supplied to a third hopper 100 (the packing unit 48). In the present embodiment, the second motor 25 constitutes a supply means. Preferably, at this time, the first rotating roller 9 is rotated by the driving of the first motor 16, and the second rotating roller 10 is rotated in a direction opposite to the rotation direction of the first rotating roller 9 by the driving of the third motor 27. More specifically, in case where the first rotating roller 9 is located at the right of the second rotating roller 10, the first rotating roller is rotated clockwise and the second rotating roller 10 is rotated counterclockwise. In case where the first rotating roller 9 is located at the left of the second rotating roller 10, the first rotating roller is rotated counterclockwise and the second rotating roller 10 is rotated clockwise. Thus, a force is applied to the shape-fixed medicine 29 in a direction in which the shape-fixed medicine is discharged from the gap formed as described above. Further, in the medicine discharge position, the third hopper 100 (see FIG. 13) is disposed below the medicine support part 3. Slits (not shown) are respectively formed in both sides of an entrance portion of the third hopper 100. A sensor 103, which includes a light emitting element 101 and a light receiving element 102 disposed at the both sides respectively as shown in FIG. 15, can detect, through the slits, the passing shape-fixed medicine 29. The shape-fixed medicines 29 supplied to the third hopper 100 can be counted based on the number of times being detected. Further, based on the detection of the sensor 103, it may be detected whether the shape-fixed medicine 29 whose image has been captured enters the third hopper 100 located below the medicine support part 3. Further, the result of detection may be presented to a user.

(3-3-6. Spare Position P6)

The spare position may be used, for example, in case where the medicine cassettes 58 are additionally installed. Therefore, when the number of the medicine cassettes 58 to be additionally installed increases further, it is also possible to set the stop positions of the medicine support part 3 more than six positions. Further, the spare position may be used as a location where the shape-fixed medicine 29 whose inspection result is determined to be improper is discharged. In this case, it is necessary to provide the third motor 27 or the like so that the second rotating roller 10 can be pivoted.

(3-4. Printing Unit 47)

As shown in FIG. 9, the printing unit 47 includes a roll 86 in which a half-folded packing paper 85 is wound, and a printer 87 which prints a name of the shape-fixed medicine 29, dosage instructions or the like on a surface of the packing paper 85 unwound from the roll 86 based on inputted prescription data. A residual quantity of the packing paper 85 wound in the roll 86 is detected by a residual quantity detection sensor 88, and a residual quantity signal is transmitted to the control unit 49. Further, a paper depletion sensor 89 is provided on the way of a conveyance path of the packing paper 85 unwound from the roll 86 to detect a depletion occurrence of the packing paper 85, and transmits a depletion signal to the control unit 49.

(3-5. Packing unit 48)

The packing unit 48 includes heater rollers 90 disposed at both lateral sides of the packing paper 85 which is obliquely conveyed from above toward below. The heater rollers 90 pack the shape-fixed medicines one pack at a time while conveying the packing paper 85 by the rotation of the heater rollers. At an upstream side of the heater rollers 90 with respect to a conveyance direction of the packing paper 85, a lower opening portion of the third hopper 100 is disposed between the half-folded packing paper 85 which is being conveyed. Further, a cutter 91 is provided at a downstream side of the heater rollers 90 with respect to the conveyance direction of the packing paper 85 so that the packing paper 85 can be cut by a desired number of packs. Further, at a downstream side of the cutter 91 with respect to the conveyance direction of the packing paper 85, a conveyor 92 is provided to convey the cut packing paper 85 to a removal position.

(3-6. Control Unit 49)

As shown in FIG. 11, the control unit 49 transmits and receives signals to and from a server 93 in which a plurality of prescription data are stored, and accumulates commands from the server 93 into a buffer 94. The control unit drives and controls the automatic medicine supply part 55 (the medicine cassette 58) or the manual distribution medicine supply part 56 according to the commands, thus dispensing a corresponding shape-fixed medicine 29. Further, at the same time, the control unit drives and controls the packing unit 48 such that dosing information on the shape-fixed medicine 29 to be dispensed is printed on the packing paper 85, and the control unit drives the packing unit 48 such that the packing unit packs the shape-fixed medicines 29 one dosage at a time. Further, the control unit causes the touch panel 51 to display an inspection result from the medicine inspection assistance unit 46 which is performed as described below. Further, a data table including medicine information (a shape-fixed medicine identifier, a medicine name, a medicine code, usage instructions, efficacy, a medicine image, a shape-fixed medicine identifier provided in a surface of shape-fixed medicine 29, etc.) in addition to the prescription data is stored in a memory part of the server 93. Those may be stored in a memory part of the control unit 49.

4. Operation of Medicine Packing Device 43

Next, descriptions are made as to the operation of the medicine packing device 43 configured as described above. Herein, the medicine inspection process, which is a feature of the present invention and is performed before packing the shape-fixed medicines 29, is mainly described.

The shape-fixed medicines 29 supplied from the medicine supply unit 45 based on the prescription data reaches the medicine inspection assistance unit 46 through a passage (not shown). The shape-fixed medicines 29 supplied from the respective medicine cassettes 58 of the automatic medicine supply part 55 pass the first hopper 59 one by one from the medicine passage, and are directly supplied to the medicine support part 3 positioned in the first medicine supply position P1. Each time when the shape-fixed medicines 29 are supplied one by one to the medicine support part 3, the rotary plate 67 is rotated by 60°.

Further, a plurality of the shape-fixed medicines 29, which are supplied from the manual distribution medicine supply part 56 through the second hopper 62 based on the prescription data, are first separated by the medicine separation part 68, and are then supplied one by one to the medicine support part 3 positioned in the second medicine supply position P2. Each time when the shape-fixed medicines are supplied one by one to the medicine support part 3, the rotary plate 67 is rotated by 60°. Further, to make sure that only one shape-fixed medicine 29 is supplied to the medicine support part 3, the shape-fixed medicine is not supplied in the second medicine supply position P2 to the medicine support part 3 to which the shape-fixed medicine 29 has been supplied in the first medicine supply position P1.

Here, the operation of the medicine separation part 68 is described with reference to the flowchart shown in FIG. 18. First, the rotary body 74 is moved to the lowered position to form the retention space by the cylindrical portion 73 (step S1). Then, if the shape-fixed medicines 29 are supplied from the manual distribution medicine supply part 56 (step S2), the rotary body 74 is normally and reversely rotated (step S3). Thus, the shape-fixed medicines 29 temporarily retained in the retention space are dispersed in the circumferential direction. Subsequently, the rotary body 74 is moved to the lifted position (step S4), thereby moving the shape-fixed medicines 29 in the retention space onto the rotary plate 72. Since the shape-fixed medicines 29 are moved to the radial outward side whose length in the circumferential direction becomes longer, the shape-fixed medicines 29 are further dispersed in the circumferential direction on the rotary plate 72. Since a plurality of the groove portions are formed on the rotary plate 72, the dispersed shape-fixed medicine 29 is moved radially outward along one of the groove portions.

Next, the rotary plate 72 is rotated (step S5), thereby moving the shape-fixed medicines 29 in the circumferential direction. As long as any one of the first sensor 78 to the third sensor 80 does not detect the shape-fixed medicines 29, a rotation speed of the rotary plate 72 is maintained at the fastest preset speed (first speed). At this time, the first sensor 78 detects whether the shape-fixed medicine 29 is positioned in a detection area (step S6). If the shape-fixed medicine 29 is positioned in the detection area, it is determined that the shape-fixed medicine 29 approaches the discharge position, and the rotation speed of the rotary plate 72 is changed to a second speed slower than the first speed (step S7). Further, the second sensor 79 detects whether the shape-fixed medicine 29 has passed a first detection position located at a more downstream side than the detection area (step S8). If the shape-fixed medicine 29 passes the first detection position, the rotation speed of the rotary plate 72 is changed to a third speed slower than the second speed (step S9). Further, the third sensor 80 detects whether the shape-fixed medicine 29 has passed a second detection position located at a more downstream side than the first detection position (step S10). If the shape-fixed medicine 29 passes the second detection position, the rotation speed of the rotary plate 72 is changed to a fourth speed slower than the third speed (step S11).

In this manner, the conveyance speed of the shape-fixed medicine 29 conveyed by the rotary plate 72 is slowed down step by step. Therefore, it is possible to reliably prevent a plurality of the shape-fixed medicines 29 from being discharged at a time. Then, if the shape-fixed medicine 29 is detected by the third sensor 80 (step S10), the shutter is opened (step S12). Thus, the shape-fixed medicine 29 is sent to the medicine imaging part 2 through the opening portion of the outer peripheral portion 71. The passing of the shape-fixed medicine 29 through the opening portion of the outer peripheral portion 71 is detected by a fourth sensor (not shown) (step S13). If the passing of the shape-fixed medicine 29 is detected by the fourth sensor (step S13), the rotation of the rotary plate 72 is temporarily stopped (step S14). Thus, it is possible to reliably discharge the shape-fixed medicines 29 one by one.

In the medicine imaging part 2, each time when one shape-fixed medicine 29 is supplied to the medicine support part 3, the medicine support part is rotated by a predetermined pitch (in the present embodiment, the medicine support part is rotated by 60°). If the medicine support part 3 reaches the first medicine imaging position P3 (the irradiation position of the first medicine illumination part 63), then the driving magnet 17 of the first motor 16 approaches the medicine support part 3 and therefore the drive force of the first motor 16 can be transmitted to the first rotating roller 9 in a non-contact state. Thus, the supplied shape-fixed medicine 29 is rotated by the rotation of the first rotating roller 9. In the first medicine illumination part 63, the light emitted from the LEDs 42 can be directly irradiated on the shape-fixed medicine 29. Accordingly, the shape-fixed medicine identifier, which is formed in the surface of a capsule medicine or the like by printing, can be imaged by the first camera 64.

Further, if the medicine support part 3 reaches the second medicine imaging position P4 (the irradiation position of the second medicine illumination part 65), similar to the first medicine illumination part 63, the driving magnet 17 of the first motor 16 approaches the medicine support part 3 and therefore the drive force of the first motor 16 can be transmitted to the first rotating roller 9 in a non-contact state. Thus, the supplied shape-fixed medicine 29 is rotated by the rotation of the first rotating roller 9. In the second medicine illuminating part 65, the light emitted from the LEDs 42 is reflected by the reflection member 31, and is then transmitted through the light guide member 30, and thereafter is irradiated on the shape-fixed medicine 29 from the obliquely upper side or the lateral side. If the shape-fixed medicine 29 is an engraving tablet, by irradiating the light from the obliquely upper side or the lateral side, the engraving formed in the engraving tablet can stand out boldly and can be clearly imaged by the second camera 66.

Further, in the present embodiment, the first medicine illumination part 63 and the second medicine illumination part 65 are provided. However, similar to the illumination means shown in FIG. 8, a single medicine illumination part may be used. That is to say, the LEDs 42 may consist of a first illumination group and a second illumination group, and the illumination on the shape-fixed medicine 29 may be switched into one of the illumination of the first illumination group from the lateral side and the direct illumination of the second illumination group. Thus, any one of a capsule medicine, the print of a print tablet and the engraving of an engraving tablet can be imaged by a single camera 4 of a single medicine illumination part. In each of the first medicine imaging position P3 and the second medicine imaging position P4, the first camera 64 and the second camera 66 image the shape-fixed medicine 29 in a plurality of different directions. More specifically, in each of the first medicine imaging position P3 and the second medicine imaging position P4, the shape-fixed medicine 29 is imaged at multiple times by the first camera 64 and the second camera 66 while being rotated by the first rotating roller 9 and the second rotating roller 10. Alternatively, in each of the first medicine imaging position P3 and the second medicine imaging position P4, the shape-fixed medicine 29 is imaged by the first camera 64 and the second camera 66 before rotating the first rotating roller 9 and the second rotating roller 10 and after rotating the rotating roller 9 and the second rotating roller 10.

If the shape-fixed medicine 29 is imaged by the first camera 64 and the second camera 66 in the above-described manner, a medicine inspection assistance process is executed in the following manner, based on whether a shape-fixed medicine identifier is formed in the shape-fixed medicine 29. That is to say, in case where the shape-fixed medicine 29 subject to inspection is registered and it has a shape-fixed medicine identifier, it is determined whether a dimension of the shape-fixed medicine 29 in a horizontal direction orthogonal to the axial direction of the first rotating roller 9 or the second rotating roller 10 (a left-right directional dimension of the shape-fixed medicine 29 in FIG. 6: a longitudinal dimension) is greater than a dimension of the shape-fixed medicine 29 in a direction parallel with the axial direction (an up-down directional dimension of the shape-fixed medicine 29 in FIG. 6: a transversal dimension) among the images in which the shape-fixed medicine identifier is imaged. Then, among the images satisfying a condition that the longitudinal dimension is equal to or less than the transversal dimension, an image having the longest longitudinal dimension is specified as an image for inspection. Subsequently, the specification means included in the medicine inspection assistance unit 46 reads the shape-fixed medicine identifier from the specified image and calculates a coincidence rate between the shape-fixed medicine identifier thus read and the shape-fixed medicine identifier of the shape-fixed medicine 29 designated by the prescription data. The medicine inspection process is executed based on the coincidence rate. Further, the medicine information of various types of shape-fixed medicines and shape-fixed medicine identifiers formed in the shape-fixed medicines are stored in association with each other in a memory means of the server 93. The shape-fixed medicine identifier designated by the prescription data can be read from the memory means of the server 93.

In case where the shape-fixed medicine 29 subject to inspection is registered and it does not have the shape-fixed medicine identifier, an image, which has a longitudinal dimension equal to or less than a transversal dimension and has the largest longitudinal dimension, is specified as an image for inspection among the imaged images. With regard to the shape-fixed medicine 29 having no shape-fixed medicine identifier, an external shape and a color of such a shape-fixed medicine are registered as medicine information. Accordingly, based on the specified image, the corresponding medicine information is read from the data table stored in the memory part of the server or the like, and the medicine inspection process is executed based on at least one of the external shape and the color without using the coincidence rate of the shape-fixed medicine identifier. However, when the medicine inspection process is executed according to the external shape and the color and the inspection result is not an error, it is preferable to display a master image and an imaged image in a screen instead of "OK" and to urge a user to check.

Figure 24D:
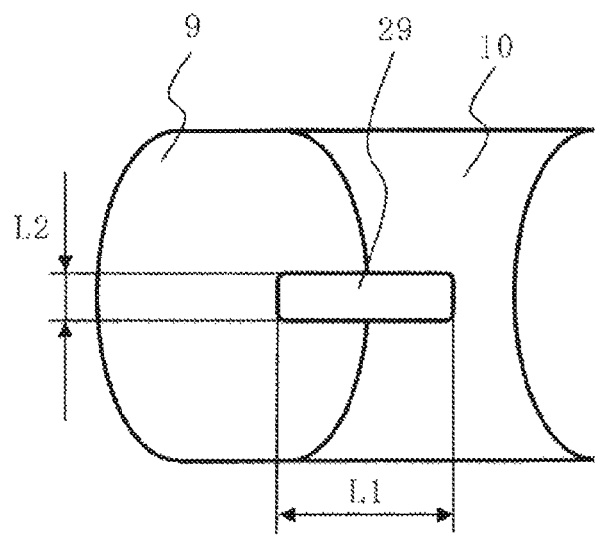
FIG. 24D shows a state where the shape-fixed medicine is rotated by rollers.
Figure 24E:
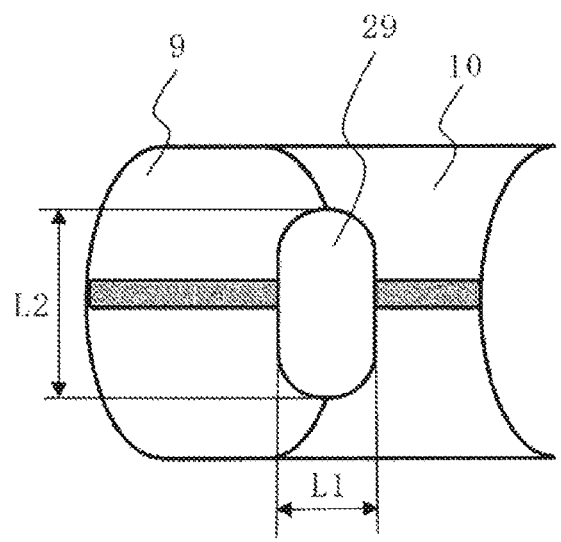
FIG. 24E shows a state where the shape-fixed medicine is rotated by rollers.

In case where the longitudinal dimension of the imaged shape-fixed medicine 29 is equal to or greater than the transversal dimension in any one of the imaged images obtained by performing the imaging at a multiple times, an error process (error notification or the like) is executed. Examples of the case where the longitudinal dimension is equal to or greater than the transversal dimension include a case where an outer circumferential surface of a disk-shaped tablet shown in FIGS. 24A and 24B is rotatably supported by the first rotating roller 9 and the second rotating roller 10 as shown in FIGS. 24C and 24D. In the disk-shaped tablet, a shape-fixed medicine identifier (XXX) is often formed in the front surface or the back surface of the tablet. Thus, it is highly likely that, as shown in FIGS. 24C and 24D, the shape-fixed medicine identifier does not face the camera 4, and there may be a case where the shape-fixed medicine identifier does not appear in the imaged image of the camera 4. Further, examples of the case where the longitudinal dimension is equal to or greater than the transversal dimension include a case where the medicine inspection assistance unit 46 recognizes the powder of the shape-fixed medicine 29, which adheres to the first rotating roller 9 and the second rotating roller 10, as a shape-fixed medicine 29. The powder of the shape-fixed medicine 29 adheres to the circumferential surfaces of the first rotating roller 9 and the second rotating roller 10. In a plan view, as shown in FIG. 24E, the portion to which the powder of the shape-fixed medicine 29 adheres is elongated in the direction orthogonal to rotation axises of these rotating rollers 9 and 10 (That is to say, the longitudinal dimension is equal to or greater than the transversal dimension). In the case where the longitudinal dimension is equal to or greater than the transversal dimension, vibration may be applied to the medicine support part 3. For example, the rotary plate 67 is slightly rotated normally and reversely. Thus, when the shape-fixed medicine 29 is supported on the medicine support part 3 as shown in FIGS. 24C and 24D, the shape-fixed medicine 29 is laid sideways and therefore the shape-fixed medicine identifier appears in the imaged image of the camera 4.

Further, if the longitudinal dimension of the imaged shape-fixed medicine 29 remains equal to or greater than the transversal dimension despite the application of vibration to the medicine support part 3, it may be determined that there is a high possibility that the powder of the shape-fixed medicine 29 adheres to one or both of the first rotating roller 9 and the second rotating roller 10. In this case, an error may be notified and a user may be urged to perform a cleaning task.

Subsequently, if the medicine support part 3 is moved to the medicine discharge position P5, the first rotating roller 9 and the second rotating roller 10 are moved away from each other by the third roller 27, thereby allowing the shape-fixed medicine 29 to drop into the third hopper 100. In this way, the shape-fixed medicines 29 corresponding to one pack are dropped one by one into the third hopper 100. A shutter is provided at the lower end portion of the third hopper 100, and the shape-fixed medicines 29 corresponding to one pack are retained in the third hopper 100. The shape-fixed medicines 29 falling from the medicine support part 3 are detected by the sensor 103. The number of the falling shape-fixed medicines 29 is counted based on the number of times be detected. If the first rotating roller 9 and the second rotating roller 10 are moved away from each other by the third roller 27 by as many times as the number of the shape-fixed medicines 29 designated by the prescription data, the medicine inspection assistance device 1 opens the shutter of the third hopper 100, thereby discharging the shape-fixed medicines 29 to the packing unit 48 where the shape-fixed medicines 29 are packed one dosage at a time. Then, a count inspection process is executed to determine whether the quantity of the shape-fixed medicines 29 to be packed into one pack according to the prescription data coincides with the quantity of the shape-fixed medicines 29 counted on the basis of the number of times be detected by sensor 103. By detecting the quantity of the shape-fixed medicines 29 whose images are captured immediately before packing, it is possible to guarantee that a predetermined quantity of shape-fixed medicines 29 are reliably packed. In other words, if the shape-fixed medicines falling from the medicine support part 3 are detected by the sensor 103 at the entrance portion of the third hopper 100 immediately above the packing unit 48 and below the medicine support part 3, it is possible to guarantee that the shape-fixed medicines having specified shape-fixed medicine identifiers are packed in the packing unit 48. Further, a function of counting the number of the shape-fixed medicines 29 on the basis of the number of times being detected by the sensor 103 is executed by a count means of the medicine inspection assistance device. The count inspection is performed only by the sensor 103 provided in the medicine discharge position P5. However, by performing a so-called double check wherein a count result obtained by a discharge sensor (not shown) for detecting the discharge of the shape-fixed medicines 29 from the medicine cassette 58 is also used to determine whether the count result of the sensor 103 and the count result of the discharge sensor coincide with each other, it is possible to further enhance the reliability of the inspection assistance process. Further, in case where the medicine packing device 43 continuously creates medicine packs, as described above, the shape-fixed medicines to be packed into the first-created medicine pack are dispensed one by one to the medicine support part 3 and are imaged by the first camera 64 and the second camera 66. Also, the shape-fixed medicine identifiers are specified by the specification means and the passage of the shape-fixed medicines is detected by the sensor 103. However, with regard to the shape-fixed medicines 29 to be packed in other medicine packs (the second and subsequent medicine packs), a process may be performed by way of the example shown below. As one example, the shape-fixed medicines 29 are dispensed to the medicine support part 3 per unit of one pack or one by one, and are imaged by the first camera 64 and the second camera 66, and then the passage of the shape-fixed medicines 29 is detected by the sensor 103. In this example, the shape-fixed medicine identifiers of the shape-fixed medicines 29 are not specified by the specification means. As another example, the shape-fixed medicines 29 are dispensed to the medicine support part 3 per unit of one pack or one by one, and the passage of the shape-fixed medicines 29 is detected by the sensor 103. In this example, the shape-fixed medicines 29 are not imaged by the first camera 64 and the second camera 66, and the shape-fixed medicine identifiers are not specified by the specification means. As a further example, the shape-fixed medicines 29 are dispensed to the medicine support part 3 per unit of one pack or one by one and are imaged by the first camera 64 and the second camera 66. In this example, the passage of the shape-fixed medicines 29 is not detected by the sensor 103, and the shape-fixed medicine identifiers are not specified by the specification means. Further, for example, a sensor (not shown) may be provided under the third hopper 100 so that the shape-fixed medicines 29 moving (falling) from the third hopper 100 toward the packing paper 85 can be detected by such a sensor. By providing such a sensor under the third hopper 100, it is possible to detect that the imaged shape-fixed medicines has passed the third hopper 100. In addition, the detection result may be presented to a user. Further, instead of providing the shutter in the third hopper 100, the shape-fixed medicines 29 may be moved to the packing paper 85 one by one. In this case, if a sensor is provided under the third hopper 100, the number of the shape-fixed medicines 29 moved to the packing paper 85 may be determined based on the number of times at which such a sensor has detected the shape-fixed medicines 29.

FIGS. 19A, 20, 22A and 23B show examples where inspection results are displayed in a screen. The image shown in FIG. 19A consist of a list table which includes images (master images) of the front and back surfaces of the respective shape-fixed medicines 29 to be packed and dosing dates (the first day, the second day, . . . ) enumerated by each dosing time. In this example, it is assumed that the medicine packs are created in the following order: a medicine pack for "the morning of the first day"; a medicine pack for "the morning of the second day"; a medicine pack for "the morning of the third day"; . . . ; a medicine pack for the "morning of the seventh day"; a medicine pack for "the daytime of the second day"; . . . , etc. Further, dosing patterns designated by the prescription are such that one tablet of medicine A, one tablet of medicine B and two tablets of medicine C are dosed with respect to the morning, and one tablet of medicine B and two tablets of medicine C are dosed with respect to the daytime. With regard to the presence or absence of one tablet of medicine A, the dosing pattern is different between the morning and the daytime. With regard to the medicine pack for the morning of the first day which is the first medicine pack, an image (imaged image) of one surface having a shape-fixed medicine identifier of each of the shape-fixed medicines 29 to be packed is extracted and displayed. This image is an image which is imaged by each of the first camera 64 and the second camera 66 and is used for specifying the shape-fixed medicine identifier. With regard to the shape-fixed medicines to be packed into medicine packs which have a dosing pattern of the prescription differing from that of an immediately previous medicine pack among the second and subsequent packs, the same process as the process for the first medicine pack is executed. Specifically, such shape-fixed medicines are dispensed one by one to the medicine support part 3 and are imaged by the first camera 64 and the second camera 66. Also, the shape-fixed medicine identifiers are specified by the specification means, and the passage of the shape-fixed medicines 29 is detected by the sensor 103. With regard to the medicine packs having a dosing pattern of the prescription differing from that of an immediately previous medicine pack among the second and subsequent packs, the same type of information in the screen (the image of one surface of each shape-fixed medicine 29 having the shape-fixed medicine identifier) as that of the first pack is displayed. With regard to the shape-fixed medicines to be packed into medicine packs having the same dosing pattern of the prescription as that of a immediately previous medicine pack among the second and subsequent packs, such shape-fixed medicines are dispensed to the medicine support part 3 per unit of one pack and are imaged by the first camera 64 and the second camera 66. Also, the passage of the shape-fixed medicines is detected by the sensor 103, but the shape-fixed medicine identifiers are not specified by the specification means. With regard to the medicine packs having the same dosing pattern of the prescription as that of a immediately previous medicine pack among the second and subsequent packs, the images, which are obtained by imaging all the shape-fixed medicines of a unit of one pack supported on the medicine support part 3 by the first camera 64 or the second camera 66, are displayed. If the dosing date in FIG. 19A is touched (or clicked on), a check screen of a unit of one pack is displayed as shown in FIG. 19B. In the check screen, a master image, an imaged image and the result (OK or NG) of the medicine inspection process are displayed with respect to each of the shape-fixed medicines 29. In this regard, the inspection result "OK" means a case where the coincidence rate between the shape-fixed medicine identifier specified by the specification means and the shape-fixed medicine identifier of the shape-fixed medicine 29 designated by the prescription data is equal to or greater than a predetermined threshold value. Further, the threshold value may be different between the case where the shape-fixed medicine 29 subject to inspection is dispensed from the medicine cassette 58 and the case where the shape-fixed medicine 29 subject to inspection is dispensed from the manual distribution medicine supply part 56. For example, if the threshold value of the case where the shape-fixed medicine 29 subject to inspection is dispensed from the medicine cassette 58 is set as a first threshold value, the threshold value of case where the shape-fixed medicine 29 subject to inspection is dispensed from the manual distribution medicine supply part 56 may be set a second threshold value higher than the first threshold value. This is because, in a manual distribution task of distributing the shape-fixed medicines to the manual distribution medicine supply part 56, shape-fixed medicines not designated by the prescription may be distributed due to a mistake of the user of the medicine packing device 43. The reason for setting the above-described first and second threshold values is to reliably detect the distribution mistake in such a manual distribution task. Further, a printing layout of the medicine pack subject to check may be displayed in the check screen of FIG. 19B. This makes it easy to understand which of the medicine packs is subject to check.

Further, with regard to the shape-fixed medicines to be packed into the medicine packs having the same dosing pattern of the prescription as that of an immediately previous medicine pack among the second and subsequent packs, such shape-fixed medicines are dispensed one by one to the medicine support part 3, and the passage of the shape-fixed medicines is detected by the sensor 103. Also, the shape-fixed medicines are not imaged by the first camera 64 and the second camera 66, and the shape-fixed medicine identifiers are not specified by the specification means. A screen display example of those cases is shown in FIG. 20. As shown in FIG. 20, with regard to the medicine pack having the same dosing pattern of the prescription as that of a immediately previous medicine pack among the second and subsequent packs, the number, which is counted based on the number of detection times of the passage of the shape-fixed medicines 29 detected by the sensor 103, is displayed as the number of shape-fixed medicines to be packed. Further, with regard to other medicine packs, the number, which is counted based on the number of detection times of the passage of the shape-fixed medicines 29 detected by the sensor 103, may be displayed as the number of shape-fixed medicines to be packed. Further, "OK" may be displayed if the number to be displayed coincides with the number designated by the prescription. "NG" may be displayed if the number to be displayed does not coincide with the number designated by the prescription.

Further, it is preferable that displayed contents is freely changeably set. In the above example, an arrangement order of the medicine packs in the screen is in agreement with a creation order of the medicine packs. However, the arrangement order of the medicine packs in the screen may be freely set by a user through a setting screen (by sorting or the like).

With regard to the shape-fixed medicines to be packed into a specific medicine pack among the second and subsequent medicine packs, the shape-fixed medicine identifiers are not specified by the specification means. However, in case of the medicine pack into which the following shape-fixed medicines 29 are packed, the shape-fixed medicine identifiers may be forcibly specified by the specification means. Examples of such shape-fixed medicines include a medicine which frequently makes the result of "NG" in the above-described medicine inspection process, a medicine to be cautiously handled such as a dangerous medicine, a psychotropic medicine or the like, an expensive medicine, and a medicine similar in an external shape and dangerous when mistakenly dosed. Such medicines may be stored in the server 93 or the like so as to be distinguishable from other medicines. In the case where such medicines are subject to packing, the shape-fixed medicine identifiers may be automatically specified by the specification means.

In the above-described manner, the shape-fixed medicines 29 are sequentially discharged to and retained in the third hopper 100. Then, the shape-fixed medicines 29 of one pack (of a unit of one dosage) are retained, and are then discharged to the packing unit 48, and are thereafter packed into a packing paper. Thus, a medicine pack is formed. Further, if the result of inspection indicates that there is no problem (if the inspection is not NG), the shape-fixed medicines 29 in the third hopper 100 are packed into a corresponding pack of the packing paper 85 on which a corresponding dosing information (names of the shape-fixed medicines 29, dosing instruction, etc.) is printed by the printing unit 47. The packing may be performed automatically, or may be performed by first displaying a check button and manipulating the check button. Thus, the shape-fixed medicines 29 can be reliably supplied to and packed into one medicine pack on which the corresponding printing is performed in the state where the shape-fixed medicines are retained in the hopper 100. On the other hand, if the result of inspection indicates that a problem has occurred, for example, the purport that an error has occurred may be printed on the corresponding pack. If the printing has already been completed in the corresponding pack, the printing of the purport that an error has occurred may be performed on the packing paper 85 subsequent to the corresponding pack.

Figure 21:
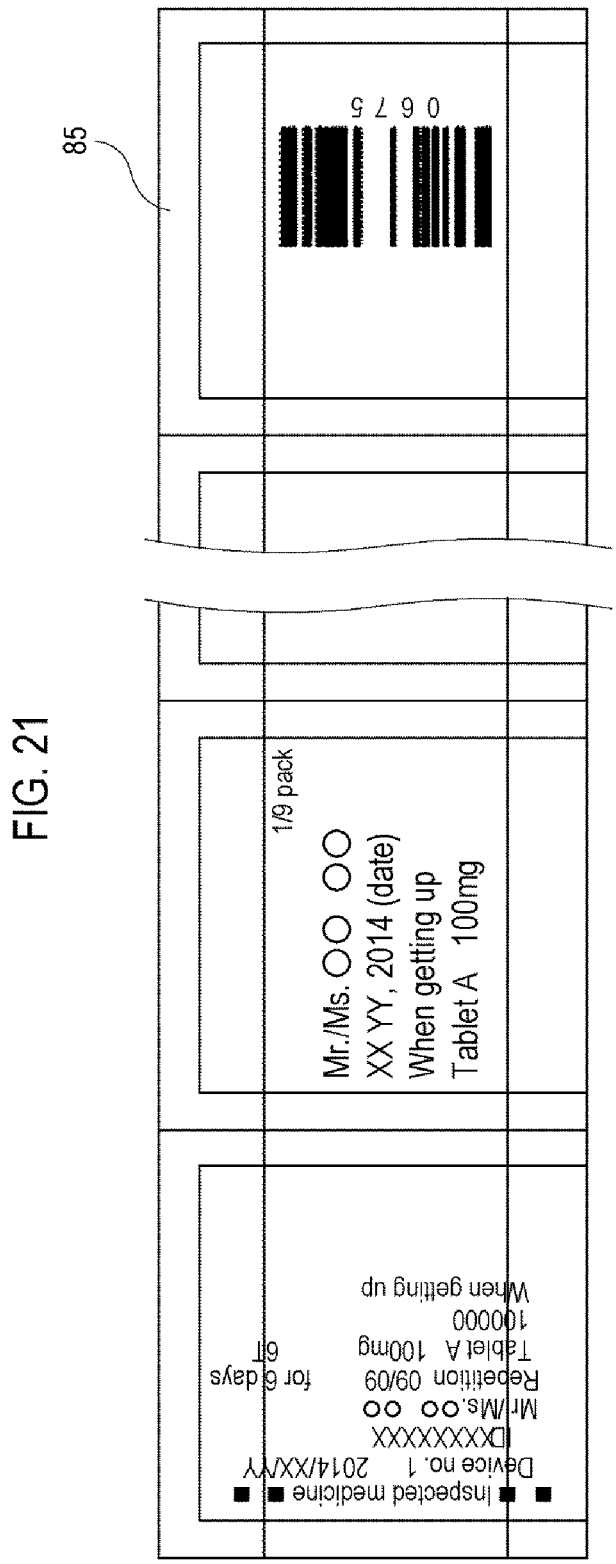
FIG. 21 is a front view showing one example of a packing paper into which shape-fixed medicines are packed by the packing unit shown in FIG. 9.

FIG. 21 shows an example of the medicine packs on which printing is performed and into which the shape-fixed medicines 29 are packed. Further, with regard to the example in FIG. 21, the medicine pack refers to a medicine pack into which the shape-fixed medicines are packed. The information on the prescribed shape-fixed medicines, such as a packing device, a packing time, a patient ID, a patient name, shape-fixed medicine names, dosing times and the like, is printed on a pack preceding the first medicine pack. The serial number of the packs (only ⅕ pack is shown in this example), the patient name, the dosing time, the shape-fixed medicine name and the like are printed on the first and subsequent medicine packs in the dosing order. A barcode is printed on the pack subsequent to the final medicine pack. By reading this barcode with the barcode reader 52, the result of the medicine inspection process on the shape-fixed medicines packed into the barcode-printed packing paper can be displayed in the screen as shown in FIGS. 19A, 20, 22A and 23B. Further, if the result of the medicine inspection process indicates that the compared medicine information does not coincide with each other, it is determined that an error has occurred. Then, printing is performed on the error-occurring location of the packing paper 85 such that it can be distinguished from other locations.

If the barcode of the packing paper 85 is read by the barcode reader 52, the result of the medicine inspection process on the shape-fixed medicines 29 packed into the packing paper 85 is displayed in the touch panel 51.

FIG. 22A shows an example of an output image to be displayed. This output image includes the medicine name, the result of the medicine inspection process, the correct image (the correct images of the front and back surfaces) of the shape-fixed medicine (a correct shape-fixed medicine) to be originally packed, and the images imaged before packing which are arranged sequentially from the first pack. The example of FIG. 22A shows that the shape-fixed medicines other than the correct shape-fixed medicine are packed into the 1st, 2nd, 4th and 6th packs and the errors are indicated. The image of each of those error-indicated packs is edged with a distinguishable color (for example, a red color). Further, in an upper right field, characters reading "NG" are displayed as the inspection result. Thus, a user (pharmacist) can easily grasp, at a glance, that the errors occur at which packs.

Figure 22B:
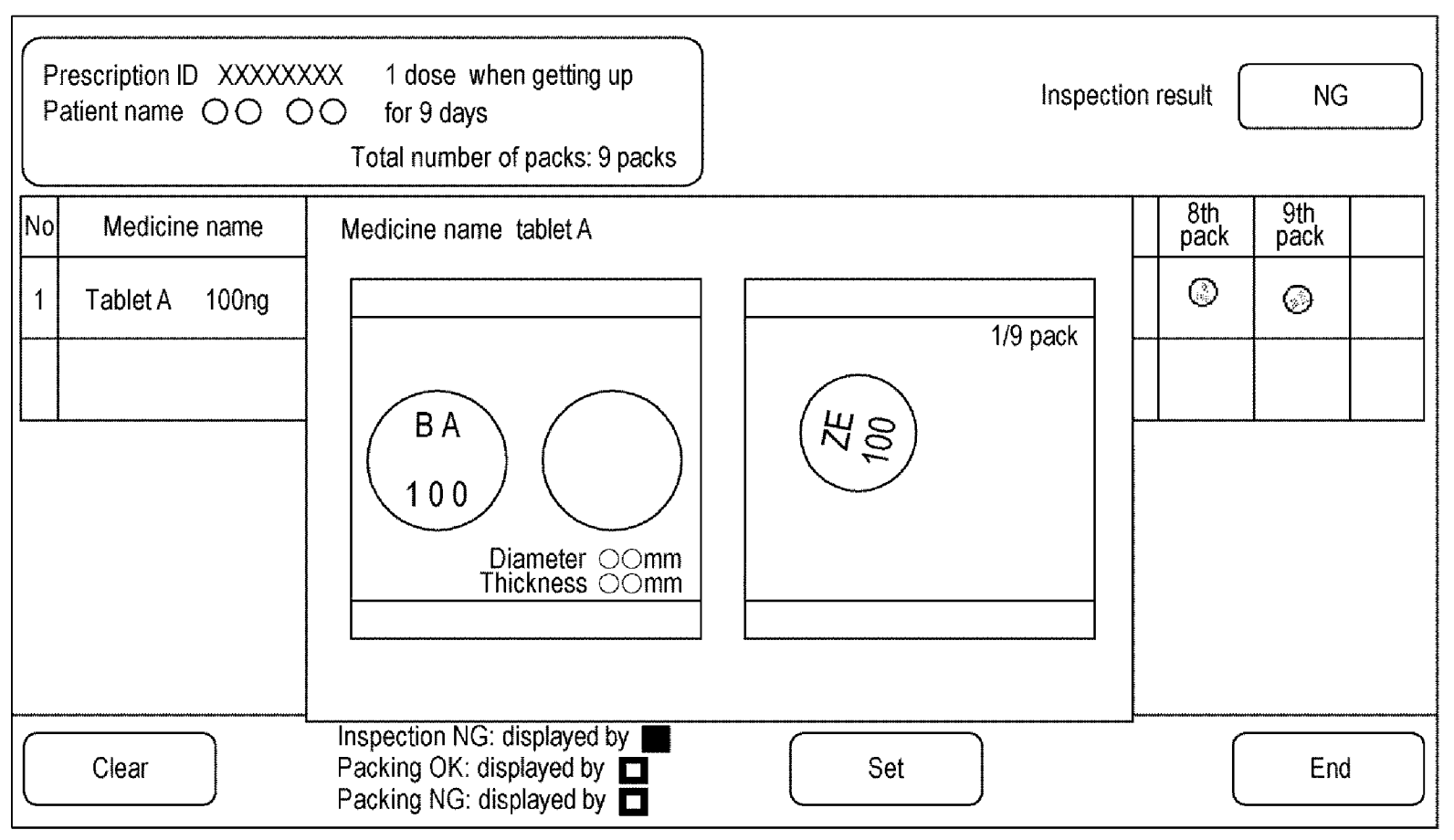

Furthermore, by touching each displayed pack with a finger (or clicking on it with a mouse) on the output image, it is possible to pop up an enlarged screen shown in FIG. 22B. A first screen and a second screen are displayed in the enlarged screen. In the first screen, there are displayed an images of the front and back surfaces of the correct shape-fixed medicine and numerical values indicating a diameter and a thickness of the correct shape-fixed medicine. In the second screen, there is displayed the imaged image of the shape-fixed medicine (the shape-fixed medicine identifier) in the selected pack.

By displaying the result of inspection in the screen and indicating the error in an distinguishable state as described above, a user can easily specify that the error occurs at which pack. Further, in addition to specifying that the error occurs at which pack, the distinguishable printing is performed on the corresponding pack of the packing paper 85. Thus, it is possible to specify the error location with more ease and to improve usage convenience. Further, with regard to the example in FIG. 22A, it may be displayed whether the passage of each shape-fixed medicine 29 is detected by the sensor 103. Thus, it is possible to check from the screen not only whether the shape-fixed medicine 29 dispensed from the medicine cassette 58 or the manual distribution medicine supply part 56 is designated by the prescription data, but also whether the medicine having the shape-fixed medicine identifier specified by the specification means is reliably packed into the packing paper 85. With regard to the shape-fixed medicine whose passage has been detected by the sensor 103, the purport of being detected of the passage is displayed around the image of such a shape-fixed medicine.

Further, in case where the shape-fixed medicine 29 to be packed in each pack is consecutively different from the shape-fixed medicine 29 to be originally packed, it may be determined that other shape-fixed medicines 29 are erroneously received in the medicine cassette 58, and such purport may be notified as an error.

Further, the imaging performed by the imaging part may be performed several times with respect to one shape-fixed medicine 29, and such images may be outputted as the inspection result. By way of example, respective images of the front and back surfaces of the one shape-fixed medicine 29 may be outputted as an imaging result.

Further, with regard to displaying the image inspection result in the touch panel 51, the image data of the shape-fixed medicine 29 are displayed distinguishably per unit of packing (a unit of a dosing time) for packing to the packing paper 85. Further, the image data of the shape-fixed medicines 29 displayed per each unit of packing is rearranged in a predetermined order of the types of the shape-fixed medicines 29. A pharmacist can easily check the inspection results based on the displayed image data. If the shape-fixed medicines 17 are not properly dispensed as a result of inspection, it is preferable to display an error indication by changing the color of the image of such a shape-fixed medicine 29 in the touch panel 51, or by allowing the image of such a shape-fixed medicine 29 to flicker in the touch panel 51.

By way of example, FIG. 23B shows an example of an inspection result screen which is displayed after performing the medicine inspection process with respect to the prescription data shown in FIG. 23A. In this example, error locations are indicated by marking oblique lines to relevant cells, but indication symbols become red in practice. For example, a dosage to be taken in a daytime is two tablets of a shape-fixed medicine A (○), one tablet of a shape-fixed medicine B (Δ), and one tablet of a shape-fixed medicine C (□). And, such daytime dosages are displayed as ○, ○, Δ, □ in a predetermined order. In a daytime on the sixth day, the shape-fixed medicine A (○) is indicated by only one tablet, and the locations, which must be originally displayed as ○, ○, Δ, ○, are displayed as ○, -, Δ, □ (the error (-) is displayed in red) instead. Further, in a daytime on the seventh day, the shape-fixed medicine A (○), which must be packed for the daytime on the sixth day, is added, and the daytime on the seventh day is displayed as ○, ○, ○, □, ○ (in red).

Further, the shape-fixed medicine 29 is displayed as a simplified figure such as "○" in FIG. 23B, but the image data of the shape-fixed medicine 29 is displayed in practice. Where the shape-fixed medicine is, for example, a tablet, it is preferable to display image data of both the front and back surfaces of the tablet. For the purpose of better understanding of the inspection result, an extra column may be added and the inspection results may be displayed in such a column as "○" when proper, or as "x" when it is an error case. Further, the location of an error occurrence may be displayed in an easily distinguishable color such as a red color. Further, an enlarged image may be pop-up displayed by clicking on the image data of the corresponding shape-fixed medicine 29 on the screen. Therefore, it is possible to perform a more reliable check of the shape-fixed medicine 29, in particular, the shape-fixed medicine identifier such as an engraving formed in the shape-fixed medicine.

In this way, the medicine inspection result is displayed per unit of packing (a dosage) to the packing paper 85 and in a predetermined order of the types of the shape-fixed medicines 29. Thus, the user can very easily observe the medicine inspection result and easily determine the medicine inspection result. Furthermore, since the location of error occurrence is displayed to be easily distinguishable from others, the user cannot mistakenly observe the location of error occurrence. Further, the medicine inspection assistance device 1 may merely specify the shape-fixed medicine identifier without determining whether the medicine information corresponding to the shape-fixed medicine identifier specified by the specification means coincides with the medicine information of the shape-fixed medicine designated by the prescription data. In this case, a user performs inspection based on the specified shape-fixed medicine identifier. The burden of a user's inspection task can be reduced since the shape-fixed medicine identifier is specified as such.

5. Other Embodiments

Further, the present invention is not limited to the configurations of the above-described embodiment, and various modifications can be made.

In the above-described embodiment, only one shape-fixed medicine 29 is supplied to the medicine support part 3. However, it is also possible to supply a plurality of the shape-fixed medicines 29 to the medicine support part 3. In this case, as long as the respective shape-fixed medicines 29 do not overlap with each other when the first rotating roller and the second rotating roller are rotated, the number of the shape-fixed medicines 29 is not limited and a combination of the shape-fixed medicines 29 such as a combination of tablets, a combination of capsule medicines, a combination of tablets and capsule medicines, or the like.

In the above-described embodiment, only the second rotating roller 10 is pivoted to form a gap between the second rotating roller 10 and the first rotating roller 9. However, such a gap may be obtained by pivoting the first rotating roller 9 or by pivoting both the first rotating roller 9 and the second rotating roller 10.

The above-described embodiment has been described with respect to the case of using the medicine information which is stored in advance as a data table in the memory part of a server or the like. However, the medicine inspection assistance device 1 can be used even in case of newly registering a new medicine. That is to say, in case where the shape-fixed medicine identifier extracted from the image data is not present in the data table, such fact is displayed in the screen to urge a user to check the same. If it is determined as a result of the check that the shape-fixed medicine 29 subject to inspection is not registered, the read shape-fixed medicine identifier and the information (a name of the shape-fixed medicine 29, an identification code, etc.) on such a shape-fixed medicine 29 are stored in association with each other. Thus, newly registered data can be used from the next inspection.

In the above-described embodiment, the shape-fixed medicine 29 is consecutively imaged by the camera 4 while continuously rotating the shape-fixed medicine 29 in the medicine support part 3, and the inspection is performed by extracting the image whose shape-fixed medicine identifier is clear. However, it is preferable that the shape-fixed medicine 29 makes at least one rotation (for example, one and half rotation).

In the above-described embodiment, in case where the shape-fixed medicine identifier cannot be specified from the imaged image of the shape-fixed medicine 29, the following procedure may be performed.

That is to say, the appearance information such as a shape, a size, a color and the like of the shape-fixed medicine is registered in advance as the medicine information in the memory part of the server or the like. In this regard, an image of the shape-fixed medicine 29 received in the medicine cassette 58 is imaged, and the imaged image and the identification number of the medicine cassette 58 stored in the RFID 60 of the medicine cassette 58 are stored in association with each other. Then, in the case where the shape-fixed medicine identifier cannot be detected from the shape-fixed medicine 29, the data table is searched based on the appearance information of the shape-fixed medicine obtained by the imaging. If a coinciding appearance information cannot be obtained as a result of the search, an error is notified. If the coinciding appearance information is obtained, a process is performed as follows.

(1) Without requesting a user's determination, it is automatically determined that a proper shape-fixed medicine is supplied. (2) A fact that information other than the shape-fixed medicine identifier coincides is notified, and a user (pharmacist) is requested to make a final determination. In the case of (1), the shape-fixed medicine is handled in the same manner as the case where the comparison using the shape-fixed medicine identifier is completed. Thus, the shape-fixed medicine is packed, as it is, into the packing paper, on which the corresponding medicine information (the name of the shape-fixed medicine, the dosing information (the dosing date, the dosing time (morning, daytime, etc.), and the like) are printed. In the case of (2), the image of the shape-fixed medicine subject to inspection is displayed in the screen. Examples of the image of the shape-fixed medicine may include an image obtained by imaging the shape-fixed medicine 29 received in the medicine cassette 58. Further, together with the image imaged in the past, the image imaged at the present time may be displayed. A user can check, based on the displayed image, whether there was not a mistake with respect to the shape-fixed medicine 29 (the filling of the medicine cassette with different shape-fixed medicines, the mixing of different shape-fixed medicines, etc.) when the medicine cassette 58 was filled with the shape-fixed medicines 29. Further, in the case of (2), the mistake occurrence may be merely notified to the user by displaying it in the screen (using, e.g., a symbol Δ).

Further, with regard to the shape-fixed medicine 29 supplied from the manual distribution medicine supply part 56, it is impossible to automatically determine whether the shape-fixed medicine 29 is proper like the case of (1). Therefore, by displaying the image of the shape-fixed medicine 29 like the case of (2), it is possible to inspect the shape-fixed medicine 29 before the shape-fixed medicine 29 is packed into the packing paper. Further, as the image of the shape-fixed medicine 29 supplied from the manual distribution medicine supply part 56, it is possible to use the picture of the shape-fixed medicine 29 itself, the dosing time, the name of the medicine (morning of ○ day of ○ month ○○ tablet). Further, with regard to the shape-fixed medicine 29 supplied from the manual distribution medicine supply part 56, it is preferable to more strictly perform inspection assistance when compared with the case where the shape-fixed medicine is dispensed from the medicine cassette 58. For example, it is preferable to perform the medicine inspection assistance process with respect to each and all of the supplied shape-fixed medicines 29.

In the above-described embodiment, the result of the medicine inspection assistance process is indicated in two stages of "OK" or "NG". However, according to the coincidence rate of the images, the result of the medicine inspection assistance process may be indicated in three stages including "check need". For example, even if the shape-fixed medicine is proper, there may be a case where comparison is impossible because a portion of the shape-fixed medicine identifier become thin, or a case where comparison is impossible because powder fills in an engraving and a portion of the engraving is indistinguishable. In this case, if it is possible to notify a user of such fact by a method different from "OK" or "NG", the usage convenience can be improved.

In the above-described embodiment, the purport of error occurrence is displayed with respect to all of the shape-fixed medicines 29, at which an error has occurred in the medicine inspection assistance process. However, in case where an error occurs at a predetermined number of the shape-fixed medicines 29 (for example, one shape-fixed medicine) among a plurality of the shape-fixed medicines 29 dispensed from the same medicine cassette 58, a process may be performed as follows. That is to say, it is usually inconceivable that different shape-fixed medicines 29 are mixed with the shape-fixed medicines 29 dispensed from the same medicine cassette 58. Therefore, the packing of the shape-fixed medicine 29 is continued without notifying an error. Thus, errors do not occur frequently and a smooth operation can be expected. However, a display operation for urging a user to check an error may be performed, and the medicine inspection assistance process may be performed again with respect to the shape-fixed medicine 29 at which an error has occurred.

In the above-described embodiment, in case where the timing of imaging the shape-fixed medicine 29 is constant, it is preferable to change the rotation speeds of the first rotating roller 9 and the second rotating roller 10 according to the size of the shape-fixed medicine 29. Specifically, in a case of the shape-fixed medicine 29 having a short circumferential length around a major axis, the rotation speeds are set slow so as to reliably perform the imaging of the shape-fixed medicine identifier. On the other hand, in a case of the shape-fixed medicine 29 having a long circumferential length around a major axis, the rotation speeds are set fast so as to enable rapid processing. That is to say, the rotation speeds of the first rotating roller 9 and the second rotating roller 10 are determined based on the circumferential length of the shape-fixed medicine 29. The longer the circumferential length of the shape-fixed medicines 29 is, the faster the rotational speeds are set.

In the above-described embodiment, the dispensing source of the shape-fixed medicine 29 is not specifically indicated in the displayed screen. However, it may be displayed, for example, at a left end column in FIG. 19A (so as to read "cassette", "manual distribution", etc.) that the shape-fixed medicines are dispensed from which one.

In the above-described embodiment, both the first rotating roller 9 and the second rotating roller 10 are rotated. However, it is also possible to rotate only one of the first rotating roller 9 and the second rotating roller 10 while allowing the other to serve as a rotatable free roller. Further, the position at which the sensor 103 detects the shape-fixed medicine 29 is not limited to the entrance portion of the third hopper. For example, the sensor 103 may be provided at an exit portion or a central portion of the third hopper 100. The sensor 103 may be configured to detect the number of the shape-fixed medicines 29. For example, the sensor 103 may be a sensor for calculating and detecting the number of the passing shape-fixed medicines 29 based on the time at which the shape-fixed medicine 29 passes a detection area of a sensor, a width of the shape-fixed medicine, and a volume per one shape-fixed medicine. Further, the sensor 103 may be a sensor for detecting that the shape-fixed medicine has entered the packing paper 85 (packing material). For example, the sensor 103 is configured with a camera and a means for detecting that the shape-fixed medicine 29 has entered the packing paper 85, based on an imaged image created by the camera. The camera is provided above the packing paper 85 such that the inside of the packing paper 85 folded in half falls within an imaging range. The shape-fixed medicine 29 falling from the third hopper 100 and entering the packing paper 85 is captured in the imaged image. When the shape-fixed medicine can be extracted from the imaged image, the sensor 103 recognizes that the shape-fixed medicine 29 has entered the packing paper 85, based on that the shape-fixed medicine can be extracted from the imaged image. Further, in the case where the dosing patterns in the prescription are the same in an immediately previous medicine pack and the next medicine pack, the medicine inspection assistance device 1 may detect that the shape-fixed medicines to be packed into those two medicine packs have been dispensed from the same medicine cassette. Whether the shape-fixed medicines have been dispensed from the same medicine cassette is determined based on the result of a discharge sensor which is provided in the vicinity of each medicine cassette 58 and detects the discharge of the shape-fixed medicines from each medicine cassette 58. Further, in the following cases where the server 93 stores, in association with the shape-fixed medicine identifier, whether the shape-fixed medicine identifier is formed in the shape-fixed medicine, where it is decided, based on the imaged image of the shape-fixed medicine imaged by the imaging means, whether the shape-fixed medicine identifier is formed in the shape-fixed medicine imaged by the imaging means, where it is decided that the shape-fixed medicine identifier is not formed in the shape-fixed medicine, and where it is registered in the server 93 that the shape-fixed medicine identifier is not formed in a prescribed shape-fixed medicine designated by the prescription data, the medicine inspection assistance device 1 may notify a user of such a fact that the shape-fixed medicine identifier is not formed in the imaged shape-fixed medicine and that the non-formation of the shape-fixed medicine identifier in the prescribed shape-fixed medicine is registered in the server 93. Thus, when the shape-fixed medicine having no shape-fixed medicine identifier is designated by the prescription data, by notifying a user of the fact that the shape-fixed medicine having no shape-fixed medicine identifier has been dispensed, a user is relieved of a labor of checking the presence or absence of the shape-fixed medicine identifier, and it suffices that a user merely checks the appearance or the like of the shape-fixed medicine. The process of deciding, based on the imaged image of the shape-fixed medicine imaged by the imaging means, whether the shape-fixed medicine identifier is formed in the shape-fixed medicine imaged by the imaging means, is performed by a decision means of the medicine inspection assistance device 1. When the specification means can specify the shape-fixed medicine identifier, the decision means decides that the shape-fixed medicine identifier is formed in the shape-fixed medicine imaged by the imaging means. When the specification means cannot specify the shape-fixed medicine identifier, the decision means decides that the shape-fixed medicine identifier is not formed in the shape-fixed medicine imaged by the imaging means. Further, according to the dispensing source of the shape-fixed medicine, it may be set whether or not to execute the medicine inspection process. For example, it may be set whether or not to execute the medicine inspection process individually with respect to the shape-fixed medicine whose dispensing source is the manual distribution medicine supply part 56 and the shape-fixed medicine whose dispensing source is the medicine cassette 58.

What is claimed is:

1. A medicine inspection assistance device, comprising a medicine imaging device having:
    a medicine support mechanism including a first rotating roller and a second rotating roller, the first and second rotating rollers being configured to rotatably support a shape-fixed medicine; and
    a camera configured to image the shape-fixed medicine supported on the first rotating roller and the second rotating roller from above,
    wherein the first rotating roller has an outer circumferential surface whose diameter dimension gradually increases toward an axial-directional central portion, and
    wherein the second rotating roller has an outer circumferential surface whose diameter dimension gradually decreases toward an axial-directional central portion and the second rotating roller is disposed along the outer circumferential surface of the first rotating roller.

2. The medicine inspection assistance device of claim 1, wherein an axis of the second rotating roller is located above an axis of the first rotating roller, and
    wherein the second rotating roller is configured to be rotated in the same direction as a rotation direction of the first rotating roller which faces toward the second rotating roller at an area in which the shape-fixed medicine is placed.

3. The medicine inspection assistance device of claim 1, wherein the first rotating roller and the second rotating roller are configured to be relatively moved toward or away from each other, and
    wherein the medicine imaging device further includes a guide member configured to guide one of the first and second rotating rollers to relatively move toward or away from the other, the guide member being disposed at a lateral side of a gap formed between the first rotating roller and the second rotating roller when the first rotating roller and the second rotating roller are moved away from each other.

4. The medicine inspection assistance device of claim 1, wherein the shape-fixed medicine is specified based on an appearance information of the shape-fixed medicine imaged by the camera.

5. The medicine inspection assistance device of claim 1, further comprising a device body to which the medicine support mechanism is attached,
    wherein the device body has a light illuminator configured to illuminate the shape-fixed medicine supported on the medicine support mechanism from above, and
    wherein the medicine support mechanism has a reflector configured to reflect light emitted from the light illuminator and to irradiate the reflected light on a lateral side of the shape-fixed medicine supported on the medicine support mechanism.

6. The medicine inspection assistance device of claim 5, wherein the reflector is configured to irradiate the reflected light emitted from the light illuminator on an obliquely upper side of the shape-fixed medicine.

7. A medicine inspection assistance device, comprising a medicine imaging device having:
    a medicine support mechanism including a first rotating roller and a second rotating roller, the first and second rotating rollers being configured to rotatably support a shape-fixed medicine; and a camera configured to image the shape-fixed medicine supported on the first rotating roller and the second rotating roller from above, wherein a rotation direction of the second rotating roller is reversed when the first rotating roller and the second rotating roller are relatively moved away from each other.

8. A medicine inspection assistance device, comprising a medicine imaging device having:

a medicine support mechanism including a first rotating roller and a second rotating roller, the first and second rotating rollers being configured to rotatably support a shape-fixed medicine; and a camera configured to image the shape-fixed medicine supported on the first rotating roller and the second rotating roller from above, wherein the medicine inspection assistance device comprises a plurality of the medicine support mechanisms, and wherein the plurality of the medicine support mechanisms are disposed annularly and are synchronously rotated by a predetermined pitch in a circumferential direction.

* * * * *